(12) United States Patent
Swanson et al.

(10) Patent No.: US 8,605,132 B1
(45) Date of Patent: Dec. 10, 2013

(54) METHODS, SYSTEMS AND PROGRAM PRODUCTS FOR MANAGING RESOURCE DISTRIBUTION AMONG A PLURALITY OF SERVER APPLICATIONS

(75) Inventors: Jon N. Swanson, Queensbury, NY (US); Adam M. Chapweske, Minneapolis, MN (US); Andrija Colovic, Chicago, IL (US)

(73) Assignee: Insors Integrated Communications, Chicago, IL (US)

( * ) Notice: Subject to any disclaimer, the term of this patent is extended or adjusted under 35 U.S.C. 154(b) by 225 days.

(21) Appl. No.: 13/072,321

(22) Filed: Mar. 25, 2011

Related U.S. Application Data

(60) Provisional application No. 61/317,962, filed on Mar. 26, 2010.

(51) Int. Cl.
*H04N 7/14* (2006.01)
(52) U.S. Cl.
USPC ........................................ 348/14.01; 370/260
(58) Field of Classification Search
USPC ........................................... 348/14.01–14.08
See application file for complete search history.

(56) References Cited

U.S. PATENT DOCUMENTS

| | | | | |
|---|---|---|---|---|
| 6,519,629 | B2 * | 2/2003 | Harvey et al. | 709/204 |
| 7,512,692 | B2 * | 3/2009 | Minborg et al. | 709/227 |
| 7,764,641 | B2 * | 7/2010 | Pelton et al. | 370/328 |
| 2003/0069828 | A1 * | 4/2003 | Blazey et al. | 705/37 |
| 2006/0092863 | A1 * | 5/2006 | Schmidt et al. | 370/260 |
| 2007/0285501 | A1 * | 12/2007 | Yim | 348/14.08 |
| 2012/0069131 | A1 * | 3/2012 | Abelow | 348/14.01 |

* cited by examiner

*Primary Examiner* — Maria El-Zoobi
(74) *Attorney, Agent, or Firm* — Greer, Burns & Crain, Ltd.

(57) ABSTRACT

A videoconference system in which a plurality of users communicate video and audio data to each other, the system including at least two conference servers each having a plurality of users linked to one another over the server wherein the plurality of users can share real time audio and video data with one another, the conference servers being in communication with each other, a plurality of redundant videoconference applications configured to be run on the at least two conference servers, and at least one resource distribution node configured to determine in response to a request for access to one of the videoconference applications which of the plurality of redundant videoconference applications to utilize.

21 Claims, 10 Drawing Sheets

METHODS, SYSTEMS AND PROGRAM PRODUCTS FOR MANAGING RESOURCE DISTRIBUTION AMONG A PLURALITY OF SERVER APPLICATIONS

PRIORITY CLAIM

The present application claims priority on U.S. provisional patent application Ser. No. 61/317,962 filed on Mar. 26, 2010.

FIELD

A field of the invention is videoconferences. Additional fields include methods, systems and program products for managing resource distribution among a plurality of videoconference applications and facilitating communication of data during a collaboration event such as during a videoconference.

BACKGROUND

Collaboration events such as videoconferences can occur over a data network (such as, for example, the Internet, wide area networks or local area networks). During some such events, multiple users may be sharing video, audio and other data with multiple other users. Typically, users communicate in this way by each connecting to at least one of a plurality of conference servers. The conference servers are also interconnected, which therefore provides each user with a communication connection to each other user (i.e., by using the conference servers as a link). As such, videoconferences are typically conducted over a conference server or bridge. Indeed, all attendees connect to the server, and the server routes audio and video data between the users.

Depending on the scale of the event, very large amounts of data may be shared. This can strain network and participant resources. Also, the large number of streams being communicated can complicate the event and make it difficult for users to effectively communicate with one another. Further, to enhance productivity and efficiency between multiple users, the conference servers are configured to run select server applications (e.g., an electronic drawing board). However, again issues relating to overuse and uneven distribution of the resources necessary to provide such applications are present in such complex videoconference systems. In some prior art systems, multiple identical applications may be run for redundancy, and to lower the load on each application. In such instances, though, it can be difficult to efficiently distribute users between redundant applications. These and other problems may be particularly acute in large scale conference systems where a large number of sever applications are running simultaneously.

SUMMARY

One embodiment of the invention is a videoconference system in which multiple users communicate video and audio data to one another over a data network. The example system includes at least two conference servers, each in communication with each other. Each conference server also has a plurality of users. Further included in the example system is at least one server application running on each conference server such that the videoconference system has a plurality of server applications running at any given time. Finally, the example system includes at least one resource distribution node for managing system resources. In particular, the resource distribution node is configured to determine each server application and provide resource distribution among the plurality of server applications for the plurality of users who are requesting server applications. As such, the resource distribution node serves as an intermediary between the users and the conference severs, providing for more efficient use of system resources and/or intelligent selection of servers and server applications for a given user.

Other examples of the invention and further details of embodiments are described below.

DETAILED DESCRIPTION OF EMBODIMENTS

Figure 1:
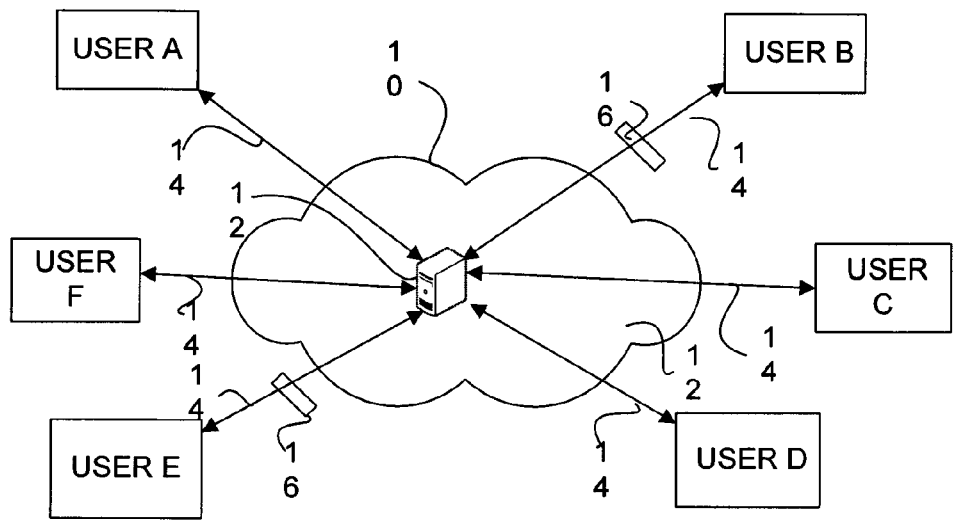
FIG. 1 is a schematic of a network useful to practice embodiments of the invention.

Many but not all embodiments of the invention are directed to resource management, traffic control, and related aspects of distributed network computing. As an example, if multiple video conference servers are launched across one or more networks or data centers, each may have various services or applications running many of which may be redundant with one another. Examples may include presence servers, bridge services, whiteboard services, chat services, data retrieval services, game services, and the like. When a new user desires to join a conference, it will be advantageous to know what servers have the services running that the particular user desires to use. It will also be useful to know which servers have the most capacity, are connected to existing users that the new user may wish to communicate with, and other dynamic details of current status of various servers.

Some embodiments of the invention address this by providing one or more resource distribution nodes that constantly and continually monitor some or all of the plurality of conference servers. The resource distribution nodes maintain a substantially real time status of the servers and know which services are running on which servers as well as other current operational details. New users and others interested in such information are directed to a resource distribution node before connecting to a server for information regarding which of the servers is the most appropriate to connect to. Resource distribution nodes of the invention may therefore be particularly user with cloud or other widely distributed computing applications. This and many other aspects of different invention embodiments are described in detail herein below.

The resource distribution nodes in many embodiments have a complete and global view of all of the computer node resources available to the plurality of conference servers. The resource distribution node constantly monitors service availability across the plurality of servers and loads on the servers, and distributes requests to the servers/applications/services with the lowest usage, and appropriate available services. In some embodiments, the resource distribution node can also information gained from client requests and/or from monitoring of the network to determine if more or less resources are needed to service the current request load. If more services are required, the resource distribution node can communicate instructions to launch such services when and where appropriate. As an example, a resource distribution node may determine that a particular service is approaching maximum capacity across one or more servers. In this case it may communicate instructions to one or more servers to launch new instances of the application to accommodate load.

Those knowledgeable in the field of cloud computing services will be familiar with API calls that these services offer to create or destroy compute node instances on demand. When deployed on a cloud computing service, the resource distribution node can use the information that it gathers to manage the quantity node resources via cloud computing APIs, thereby creating a highly scaleable and cost efficient video conferencing service. Nodes can be added when usage increases beyond a certain point, and when usage decreases, the resource distribution node can move meeting services off of some of the nodes and destroy them.

Having now presented a brief introduction to some features and functionalities of some invention embodiments, more detailed discussion can be had. Before discussing particular features of example embodiments in detail, it will be appreciated that the present invention may be embodied in a method, system, and/or computer program product, including but not limited to videoconference methods, videoconference systems and videoconference program products. For example, a method according to one embodiment may be carried out by one or more users using computers or by one or more computers executing steps of the invention, and a program product of the invention may include computer executable instructions stored on a tangible memory medium (that may be, for example, a magnetic or optical disk or other magnetic or optical media, electrical, chemical, electrochemical, or other tangible media configured for storing instructions and/or data, which storage may in at least some instances cause physical changes to the storage medium) that when executed by one or more computers cause one or more computers to carry out steps of a method of the invention. The program instructions and methods of embodiments of the invention transform data, cause results of computations and/or data to be stored in one or more memories and/or to be displayed on displays, with such storage and/or display causing a transformation of physical elements such as a physical alteration to a memory media that may be read to recover the stored data. Further, one or more computer(s) or other processor based devices in combination with connected hardware such as one or more of cameras, microphones, monitors, projectors, and the like that are carrying out steps of a method of the invention and/or that are running a program product of the invention embody a system of the invention.

Further, one or more computers, alone or in combination with connected hardware such as one or more cameras, microphones, monitors, projectors, and the like, that are carrying out a step of a method of the invention and/or that are running a program product of the invention may embody a system of the invention. It will also be appreciated that various computer program product embodiments of the invention may cause physical changes to occur, and to result in a physical transformation of data and signals to cause a tangible physical result. As examples, tangible memory devices may be physically altered to store or retrieve data; electronic or other data may be converted to cause speakers to produce sounds and to cause monitors or projectors to output light or otherwise alter the physical state of a display device so that images are displayed. In considering the below description, many additional tangible results and physical changes that occur through operation of program products of the invention will be appreciated.

It will therefore be understood that in describing a particular embodiment of the present invention, be it a method, system or program product, descriptions of other embodiments may also be made. For example, it will be understood that when describing a method of the invention, a system and/or a program product of the system may likewise be described, and vice-versa.

Some embodiments of the invention are directed to systems, program products, and methods for managing resource allocation in videoconferences, and particularly in large scale videoconferences. In such applications there may be multiple redundant conference servers, applications, and other resources distributed across a network, that are for practical purposes identical and interchangeable with one another. As used herein, the term "redundant" is intended to broadly refer to interchangeable. First and second applications are therefore redundant with one another if they are interchangeable. Redundant applications may be desirable, for instance, so that if a first application fails for some reason a redundant second may be interchanged with it.

Users may be connected to any of the redundant servers, applications, or other resources. Determining a most efficient arrangement of usage can be both a very important and a very difficult task. Embodiments of the present invention provide a novel and valuable solution, through provision of resource distribution nodes across the network that efficiently manage allocation of user connections to the distributed resources. These and other aspects of invention embodiments will be described below. Before coming to details of resource distribution nodes, however, some detail will be helpful regarding general aspects of videoconference systems, methods and program products of the invention.

Turning now to the drawings, FIG. 1 is a schematic of a network 10 that is useful to describe example methods, program products and systems of the invention. The network shown as cloud 10 includes one or more computers 12 that link Users A-F to one another for conducting videoconferences. The term computer as used herein is intended to be broadly interpreted as at least one electronic device that accepts, processes, stores (at least temporarily), and outputs data according to programmed instructions. Thus, a computer can include, by way of example and not by way of limitation, a laptop computer, mainframe computer, cell phone, personal digital assistant, and processor-based controller on a machine. The computer 12 may also comprise one or more components for linking communications between users. It may include, for example, one or more processor based devices linked to one another for communications and each having a plurality of communication ports, a software component running on one or more memories that facilitate communications, a networking card(s), a modem(s), and the like.

The computer 12 can be referred to in the video/audio conferencing and networking arts as a conference server, bridge (or as containing a bridge), or the like which can be, for example, a software component running on a server or router that controls one or more ports for interconnecting the Users A-F. As used herein the term port is intended to be broadly interpreted as a physical or logical destination and/or origination point for digital communications. Examples of ports include but are not limited to, network cards, an IP address, a TCP or UDP port number, and the like. A bridge may also comprise software useful to, for example, specific one or more ports for communication between those users. In many embodiments all users A-F are connected to one another using a single bridge or conference server 12.

In some applications, a group of individual servers 12 may be linked to one another for collectively carrying out the functionality of a server 12. In such instances the group of individual servers is viewed, for practical purposes, by the outside world or network components as being a single server 12. Upstream and downstream components essentially treat the group as being a single server, and the group of servers performs as if they were a single server. For purposes of description of the present invention, it will therefore be appreciated that the server 12 may be a group of linked servers that act as a single server.

The conference server 12 may be located on company premises, with an example being at an office where the end users A-F reside. In other applications some or all of the users A-F may be external from the location where the conference server 12 is. Some or all of users A-F may be, for example, branch offices, home-based workers or traveling employees that connect to the server 12. In still other applications, the conference server 12 may be located at a commercial communications service provider such as a telephone, broadband, or internet service provider data center, with users A-F located at one or more offices and establishing connections 14 to the conference server 14 using the internet.

The network 10 may be all or part of a digital or analog communications network, with a packet switched protocol network being one example. A particular example includes a plurality of computers electronically linked to one another and communicating data to one another in internet protocol (IP) format. The network 10 may be a physically wired network, may be a wireless network, or may be some combination of wired and wireless. The network 10 may be the Internet, a private network, a public network, a virtual private network, Local Area Network (LAN), all or part of a Wide Area Network (WAN), all or part of a Metropolitan Area Network (MAN).

The network 10 may also be a successor to the current Internet (such as, for example, the Fast Internet, or Grid, currently under development by the European Centre for Nuclear Research (CERN) based in Geneva, Switzerland). The CERN Fast Internet is expected by some to transmit data orders of magnitude faster than what is currently understood to be broadband speed. The Fast Internet and each other successors to the Internet are referred to herein simply as fast versions of the Internet.

The protocol between the computer 12 and the Users A-F may be that of a server and client. The server client relationship between the computer 12 and the Users A-F may be reversed on occasion, wherein for some tasks the computer 12 is the client and the User A-F the server, and vice-versa for other tasks.

The network 10 may be useful for a number of data communication purposes. In an example application, the network 10 is useful to facilitate a real-time communications session, such as a videoconference, between one or more of the Users A-F. Examples of a videoconference include two or more of the Users A-F communicate streaming video and/or audio communications in real-time with one another, whereby all participating users can see and hear all other users in substantially real time.

As used herein the term "real-time" is intended to broadly refer to a condition of generally corresponding to actual time. For example, data can be real-time if it takes about one minute of data playback to describe an event that took about one minute to occur. Real-time data may be, but is not necessarily, "live" data that is generated and communicated substantially contemporaneously with minimal delay or such that the delay is not obtrusive with respect to a particular application. As an example, delay of less than several seconds, or less than 1.0 or 0.25 second, or another, similar time between an event and a communications of such event to another computer user may be considered live for the purposes of the present system.

In a videoconference, for example, multiple participants may be sending and receiving live real-time video and audio data to one another—each is talking to one or more of the others in real-time with delay at a suitably minimal level so that "conversations" between users over the network can take place in real-time. It will therefore be appreciated that the terms, "live" or "real-time" when used in this context is not limited to zero delay, but instead that some minimal delay is allowed for which may be for example of the order of several seconds. The delay should not be so great as to cause difficulties in different users communicating with one another—delays greater than about 5 seconds may be unsuitable in many applications.

In many videoconference or other real-time collaboration events, all of users A-F may see and hear all others of users A-F in real-time by simultaneously communicating audio and video data streams to all others of the users A-F. Communications between each of the users A-F may be carried out on a two-way basis from the network 10, with data sent to and received from each of the Users A-F over the communications lines 14. These may comprise physically wired connections such as copper wires, optical fiber cables, or the like; or may be wireless connections. Real-time video, audio, and other data may be communicated from each of the users A-F to all others of the users A-F through the server 12 and over the communications lines 14.

A firewall 16 or other security device may isolate the users A-F from the network 10. The firewall 16 has been illustrated in FIG. 1 as located on the communications link 14. This has been done for illustration only—one or more firewalls 16 may be at any desired location useful to monitor and control access of traffic between a user A-F and the network 10.

Those knowledgeable in the art will appreciate that communications over the network 10 between the users A-F may be carried out in any of a number of generally known procedures. For example, known methods of one or more of uni-, multi-, or broadcast may be used. Also, the data may be streaming. In a streaming video communications session application, each user A-F may have one or more cameras, telephones and/or microphones from each of which is streamed a continuous, real-time data on a particular unicast or multicast address and port number. As used herein the term continuous data stream is intended to broadly refer to a data stream sent in substantially continuous succession, although some degree of intermittency is contemplated.

For example, a packetized data stream in IP may be continuous and streaming even though there may actually be some minimal delay between discrete packets. Different protocol communications may be supported by the network 10 and the users A-F, including but not limited to ITU H.320, ITU H.323, ITU H.324, SIP (session initiation protocol), RTP (real time protocol), RTSP (real time streaming protocol), RTTP (real time transport protocol), HTTP (hyper text transfer protocol) and other suitable protocol for initiating and communicating real time and streaming data. It will be appreciated that when used in this context, the term "communicated" is intended to be broadly interpreted and does not require direct communication. For example, a first user A may communicate data to a second user B, even though the data passes through a number of intermediate nodes between origination and final destination.

Figure 2:
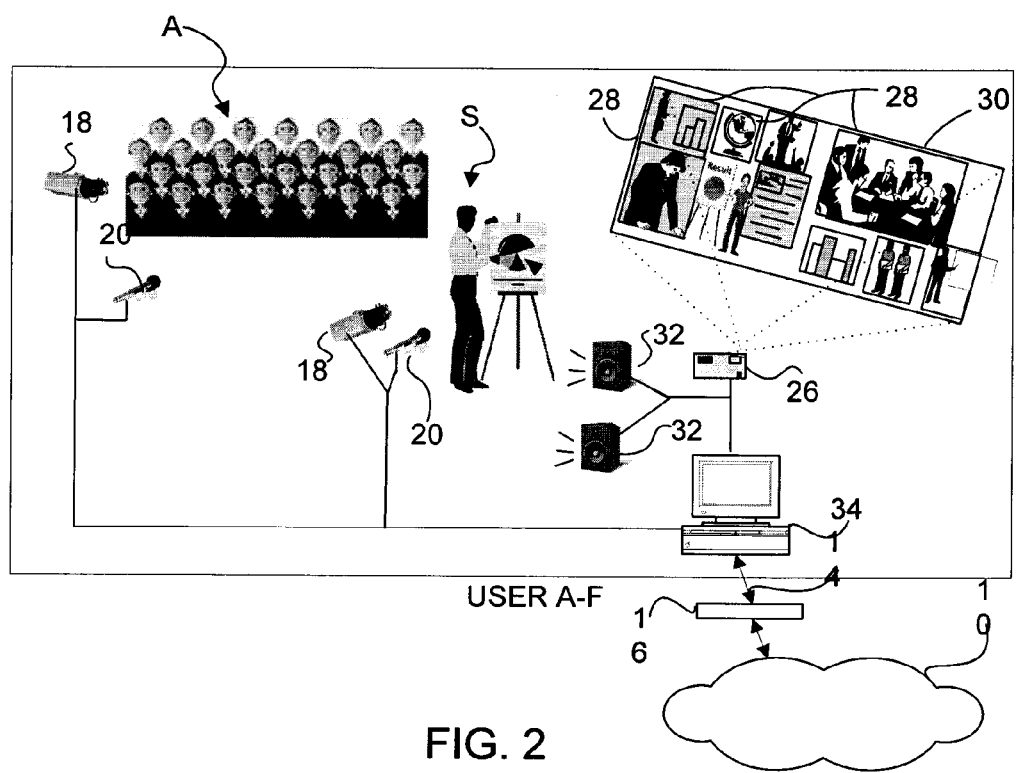
FIG. 2 is a schematic of one example video conference attendee room useful to illustrate embodiments of the invention.
Figure 3:
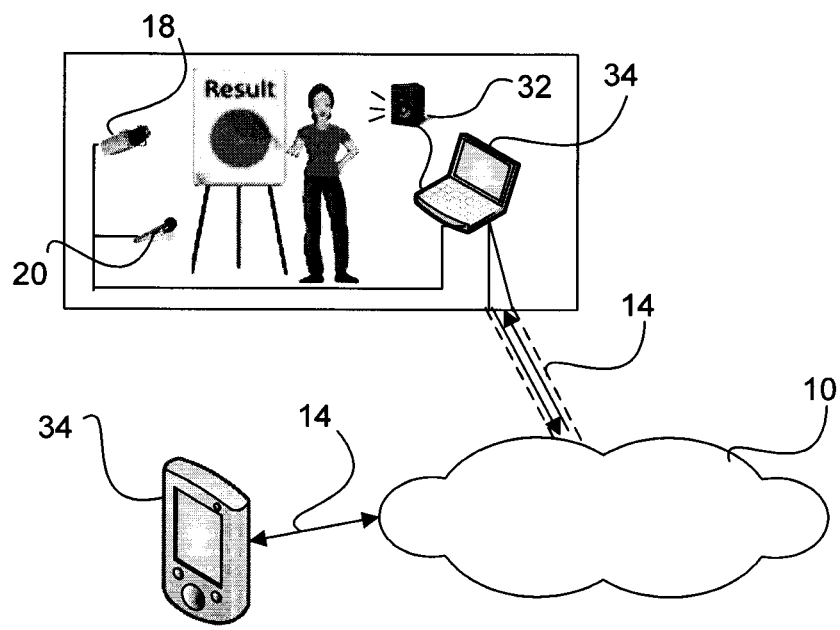
FIG. 3 is a schematic of a second video conference attendee room as well as a handheld computer useful to illustrate embodiments of the invention.

Communications of the streaming data between users A-F may be further appreciated through consideration of FIGS. 2-3 that schematically show some representative configurations of the users A-F. As shown by FIGS. 2-3, the users A-F may be conference rooms, class rooms, or other spaces in which one or multiple individuals gather to participate in the video communications session with other individuals that are located at others of the users A-F. Each user A-F may have one or more cameras, microphones, speakers, video screens, and other devices for communicating audio and video data.

With reference to FIG. 2, cameras 18 at one user A-F may be trained on different people or things at that location, with an example being one camera 18 at an audience A and one camera 18 at a speaker S. The cameras may be controllable remotely, so that user A may be able to direct the direction of a camera 18 at user B, for instance. At other locations, with examples shown in FIG. 3, only one camera 18 is present. Many different cameras will be appropriate for practice of example embodiments, with suitable examples including those available from LOGITECH Co., Fremont Calif. (e.g., Logitech QuickCam Pro 4000), the MICROSOFT LifeCam VX-1000, the SONY EVI D100 series and/or the CANON VC series of remote pan/tilt cameras, and the like. Also, many communication devices are commercially available with built in cameras, including laptop computers, smartphones, and the like.

Another example of a video source would include a video capture card installed on a first computer, which captures video output by a second computer or other hardware/software (e.g., MRI machine). Yet another example includes a computer which transmits as video its display output (i.e., its own desktop and/or launched application windows).

In FIG. 2, two microphones 20 are provided—one for receiving audio from the instructor S and a second for receiving audio from the audience A. There are a wide variety of suitable microphones available for practice of embodiments of the system, including by way of example SONY ECM microphones, PHOENIX Duet microphones, POLYCOM microphones, and the like. Although not illustrated, those knowledgeable in the art will appreciate that other cameras, microphones, computers, gateways, firewalls, mixers, multiplexers, and like devices may also be present depending on desired video communications session details and other factors. Several microphones 20 may be desirable, for instance, to surround the audience A or speaker S to ensure accurate pick-up of audio. A mixer board may be provided for mixing of audio and/or video signals. These elements may be parts of system embodiments of the invention. Also, many portable computers 34, with examples including laptop computers and portable computer devices such as personal digital assistants, cellular phones, smart phones and other devices have a microphone and/or a camera built in.

FIG. 3 illustrates an alternate configuration in which a single individual is participating in the conference at one of the locations of user A-F. In FIG. 3, only a single camera 18 is provided and a single microphone 20 along with a laptop computer 34. This could represent, for instance, a business person participating from a hotel room, train or plane while traveling. Other participants may be located, for example, in a vehicle (such as an auto, truck, train, plane, boat, etc.), a home office, or other location. The camera 18 (such as a LOGITECH QuickCam), microphone 20 and speaker 32 might be combined with a laptop, or the microphone 20 and speaker 32 might be contained in headphones worn by the user. Suitable headphones include those available from PLANTRONICS Corp. This example configuration is particularly convenient for portable participation in video communications sessions.

FIG. 3 also illustrates a second computer 34 in the form of a portable handheld device (shown in enlarged scale relative to laptop 34 for clarity) that may be used to participate in a videoconference. Computer 34 may be a handheld computer, a cellular or other portable phone equipped with a small monitor, a smartphone, a handheld entertainment device, or the like that is capable of communicating with the network 10. Examples of computer 34 include the IPHONE or IPAD from Apple Computer Corp. (Cuppertino, Calif.), a BLACKBERRY brand phone from Research in Motion, Corp., a SONY VAIO handheld micro PC (such as model number VGN-UX180) from Sony Corp., an IPAQ Smartphone from Hewlett-Packard Corp. (California) (such as model HP iPAQ 910c), or the like. Many of these and similar devices have a display, a camera and a microphone built-in, or may have these added as peripheral devices connected thereto.

In an example video communications session such as a videoconference, each of the users A-F not only sends streaming video and audio data, but likewise receives streaming video, audio, and other data communicated from some or all of the other users A-F. In many applications it is desirable to have all users send and receive streaming audio and video data to all others of the users whereby each user can see and hear all other users simultaneously. In many invention embodiments, video data streams are communicated in an individual, discrete manner. That is, each user sends and receives individual, discrete, un-bundled video data streams from all other users. Audio streams, on the other hand, may be communicated in a discrete, individual basis to a conference bridge or other location where they are bundled for convenience of communication to end user recipients. Referring once again to the schematics of FIG. 2 by way of example, one or more projectors 26 may be provided to project real-time video images 28 from one or more of the other users A-F on a screen 30.

There are a variety of suitable projectors widely commercially available, with examples including those from INFOCUS Co. such as its LP series, TOSHIBA TDP series, NEC MT series, SHARP PG series, and IBM projectors. The projectors may have specification as are appropriate for a particular application, with an example being one having at least 2000 lumens and XGA resolution. Also, it will be appreciated that use of a projector to display output images may easily be replaced with use of a monitor on which output video images are viewed. For example, FIG. 3 illustrates a laptop computer 34 and a handheld smartphone which each have an integral monitor which can be used to display output video data streams 28 from others of the users A-F.

Other larger size monitors may also be useful for display of video data, with examples including standard cathode ray tube monitors, 19", 40", 50" and larger plasma, LCD and other technology monitors. One or more speakers 32 may also be provided to play real-time audio from the other users or other sources. Also, as described above, many devices (with particular examples including laptop computers and portable phone devices) have built in displays.

Any number of video images may be provided that show video data in real-time from any number of other cameras or other sources located at the other users. For example, the user A may simultaneously display output video data streams 28 from each of the other users B-F, or may choose to display on a select subset of those streams. The display of streams may be set as desired, with different output display streams 28 located in different locations on the display 30. Further, the output video streams 28 may include charts, graphs, documents, other digital files, replayed video files, and the like. In many embodiments of the invention, users may select which video, audio and application data to view so that a highly customizable conference experience is provided for each user. The term video streams includes, but is not limited to data encoded using traditional video encoding and transmission techniques. Notably, video streams may also be embodied as periodic snapshots of a video transmitted using traditional still image encoding and transmission techniques such as JPEG transmitted via HTTP.

Digital documents such as charts, word processor documents, spreadsheets and the like may be input to any of the computers 34 at any of the users A-F for display at all or some of the other users' locations. Likewise, digital images, including stored video streams and digital documents, for instance, may be stored in a memory accessible over the network 10 for replaying during the video communications session at any or all of the users A-F. Output video streams 28 may be manipulated as desired, with examples of manipulation including moving the images, resizing the images, and the like. A particular example of a data file in addition to audio and video data includes shared files (sometime referred to as documents) having text, images, numerical values, and the like. For example, within a videoconference or virtual meeting different of the users A-F at different locations may desire to all work on a single document. In such circumstances, the single document may be described by a shared file stored on the network and which can be modified by any of the users A-F. Each user A-F receives continuous updates of the document so they are aware in close to or at real-time of modifications and the current state of the document.

A variety of other shared files may be useful in conducting collaboration events within practice of the system. It may be useful, for example, for each of the users A-F to know in (or close to) real-time which other users are connected to the network 10 and available for conferencing. This can be accomplished through the server running a user presence application and maintaining a shared user presence file on the network 10 that is regularly updated to reflect currently available users A-F.

Presence data may indicate which of users A-F are currently logged in, registered or otherwise connected to the conference server 12 and are available for conferencing. Presence data may further include information such as current status ("available," "busy—in another conference," "do not disturb," "currently conferencing in meeting no. 1234 with users 1, 13, and 17 . . . ", etc.). Presence data may also include common static user information data such as the user's handle, company name, contact information, and/or a picture. Users A-F also receive regular updates of the user presence data to ensure it is current. There may also be shared files maintained on the network 10 that list the current status of hardware at each of the users A-F (e.g., which of cameras 18 and microphones 20 are on, what their settings are, etc.), chat applications, and others. Specific techniques for ensuring accuracy of presence data will be described in greater detail below.

Embodiments of the invention may include other users (not shown) that participate in a videoconference but that do not communicate both audio and video (or other types of) data. An example includes a conference attendee (not shown) that participates over a phone together with users A-F via audio data only. Accordingly a videoconference carried out according to systems and methods of the invention may include a plurality of users (such as A-F) that each communicate audio and video data to each other, as well as additional user(s) (not shown) that participate by audio only (or video only, or some other limited set of data communication), with an example being a phone participant utilizing audio data only. In other example embodiments, users may participate in a video only mode. A participant with a smart phone, for example, may receive a video stream for viewing and/or participate by phone for an audio stream.

The one or more computers 34 at each of the users A-F may be used to receive and send all of the video, audio, documents, digital files and other data at the standard user A. The computer 34 may be referred to as a client computer or client, although as noted above it may also function at times as a server with the computer 12 being a client. A variety of computers that are currently commercially available will be suitable for use as computer 34, with examples including the Dell Precision 470 with dual processors and the HP Workstation XW6000 dual processor.

As with the computer 12, the computer 34 is intended to be broadly interpreted and is not limited to a single, desktop type computer as illustrated. Other devices that include a processor capable of executing instructions may be used, although they may sometimes be referred to as a device other than a "computer." Examples include other devices described above with reference to the laptop and handheld computers 34 illustrated in FIG. 3, as well as smart phones and other communication devices described above. Accordingly, the term "computer" as used herein with reference to computer 34 (and computer/server 12) is intended to be broadly interpreted. Further, the computer 34 may be comprised of two or more computers linked to one another.

One or more application programs, including one or more codecs, may be running on the computer 34 to transform input or output video or audio data, to provide signal coding/decoding, compression/decompression, to coordinate receiving and sending of the data streams, and to control other aspects of sending and receiving of the data streams. For example, the computer 34 may be used to control which or how many video images 28 are displayed on the screen 30, to size the images 28, to set audio levels for the speakers 32, and the like. Each computer 34 may be running a video codec, an audio codec, other codecs, one or more application programs, and other programs. These may be combined into a single application program or may be separate from one another. The computer 34 may also have video and audio capture cards, with an example being WEBCAM Corp. 4 input video capture card.

According to the configurations of FIGS. 1-3, a videoconference or other virtual meeting can occur between two or more of the users A-F. The users A-F may virtually "attend" an immersive and extensive virtual meeting that includes audio, video and/or other streaming data shared in real-time. Participants at each of the users A-F may simultaneously hear and/or view data from all others of the users A-F. Or, in some embodiments, one or more users may receive an abbreviated set of streaming data. As an example, the laptop 34 and handheld computer 34 illustrated in FIG. 3 may receive only one, two or three selected video streams. This may be desirable, for instance, to suit the relatively small screen of the handheld computer 34.

One or more users A-F may collaboratively work on one or more shared documents held on the network 10 with each receiving regular updates of modifications made by others. Such meetings may be desirable for corporations, universities, government, and other groups of people located remotely from one another that find it useful to interact in an environment that allows a greater level of intimacy and/or information sharing than an audio-only phone call or a single image video conference.

During the carrying out of a collaboration session such as a videoconference of the invention, data may be converted, transformed, stored in tangible memory media, and displayed using monitors. As an example, sound waves are received by microphones 20 and light by cameras 18 and converted to representative analog and/or digital data. This data may be communicated by computers 34 and 12, stored in tangible memory media such as magnetic, optical, chemical or electrical media on the network 10 and/or locally. Such storage may result in physical changes to the memory media. The data may also be transformed or otherwise physically changed for output. As an example, video stream data is ultimately displayed using a monitor or projector, and audio stream data is converted to power signals for causing speakers to output corresponding sound waves. These and other physical transformations of data into tangible objects or media occur through practice of embodiments of the invention.

Applications for use of video communications sessions of the present system include, but are not limited to, distance learning, medical consultation, business meetings, industry collaboration, social interaction, government or university collaborative research, entertainment, gaming, financial market trading, and the like. In a distance learning application, a professor at one site (e.g., user A) may be able to take questions from students located at many additional sites (e.g., users B-F), which can be locally located (e.g., different rooms or buildings in same campus) or very far from one another (e.g., different cities, states or countries).

In some communications sessions of the system, each of the sites can view and hear all of the other sites. In a medical consultation application, doctor specialists from around the country can participate in the diagnosis of a particular case. X-rays can be viewed by all, and each doctor at each location can discuss the case with all of the other participating doctors. In an industrial collaboration application, remotely located engineering, marketing, management, and labor teams may all discuss development of a new product. Each site may ask questions of any other site, and each site may submit documents and charts covering aspects of the project for which they are responsible.

Referring once again to FIG. 1, when a collaborative communications session such as a videoconference occurs between the users A-F, multiple video, audio and other data streams may be communicated between the various users and over the conference server 12. A rich, immersive, and extensive virtual meeting environment may be provided that includes video, audio, and other streaming data shared in real-time between multiple participants at multiple locations. Participants at each of the users A-F may simultaneously communicate audio and video data to all others of the users A-F whereby each user can simultaneously see and hear all other users. Such meetings may be desirable for corporations, universities, government, and other organizations that have groups of people located remotely from one another that need to interact in a somewhat detailed manner.

When conducting such virtual meetings, relatively large amounts of communication bandwidth may be required. Referring to the examples of FIGS. 1 and 2, in some embodiments each of the several cameras and microphones at each of the users A-F may be sent as a streaming real-time data stream to each of the other users A-F. In this manner, each user A-F receives multiple streams from all other users A-F. By way of illustration, Table 1 summarizes the data communicated over each link 14 in one example application:

| | Outgoing Data Streams: | Incoming Data Streams: |
|---|---|---|
| Users A-F | 2 Cameras, 2 Microphones, 1 application = 5 total | 25 streams (5 each from Users B-F) |

As a result, in an example meeting occurring according to the configuration of FIGS. 1-2 wherein each of the users A-F are meeting with one another, each user A-F is simultaneously streaming five discrete data streams out across the communication line 14 while also simultaneously receiving 25 discrete data streams (five from each of the five other users) across the line 14. Link 14 may therefore be required to carry 30 real time streams. The bandwidth required for each of the communications lines 14 can therefore be substantial. In some configurations, all of the audio streams from each site may be bundled together for convenience. For example, data streams A4 and A5 (MIC 1 and 2) may be bundled into a single stream. Bundling of video streams is also possible in some invention embodiments, but in many no bundling of video data is provided to allow for individual manipulation of discrete, unbundled streams. In these applications, each user may communicate to and receive from all other users discrete, unbundled video streams. In addition, video may be selectable such that each client only receives the video streams desired to be rendered at that moment. Such selection can be limited for example, by an indication of the user of what data he wishes to view, the type of videoconference the system is configured to handle, and/or a stream limit based on the type of license purchased by the user.

It will also be appreciated that the schematic of FIG. 1 is simplified, and that in typical practice communication between users A-F over the communications lines 14, network 10, and bridge 12 may be routed through a plurality of computers, routers, buffers, and the like. For instance, each communications line 14 may include multiple routers and buffers between users A-F and the network 10. One advantage of IP protocol communications is that each individual packet of data includes a destination address and may be routed over any of several available paths between origination and destination. Accordingly, each of the communications lines 14 may vary somewhat for different packets—some packets may traverse a different path than other packets between the same source and destination. Further, it will be appreciated that virtual meetings such as videoconferences may include different numbers of users than users A-F illustrated, and may, in fact, include tens, hundreds, or even more users. With larger numbers of users the traffic load across communication lines 14 increases.

It will also be appreciated that the network 10 and communications lines 14 may not be dedicated to only the virtual meeting or videoconference taking place, and may not be dedicated to the users A-F and the network 10. Many other users may be sharing each communications line 14 to communicate with the network 10. There may be substantial additional data traffic taking place over the communications line 14 during the videoconference or virtual meeting. This additional traffic may compete with the data streams being communicated between the users A-F for the bandwidth and other network resources available over the communications lines 14 and network 10. At times, insufficient bandwidth may be available to carry all of the competing traffic over one or more of the lines 14, with the result that congestion causes some traffic delay or even loss. This can lead to an unacceptable quality of communications between the users A-F.

Another factor affecting the bandwidth and other resources consumed over the network 10 can be the applications used by any of the users A-F during the video conference. These applications preferably reside on and/or are executed on the conference servers, but are not limited as such. In addition to a presence application as described above, other server applications or services may be provided for use during the video conference, including for example web request applications, bridge applications, gateway applications, recorder applications, tool applications, entertainment applications, gaming applications, music and video playback applications, mapping applications, learning applications, medical diagnostic applications, word processing applications, spreadsheet applications, security applications, data organizing applications database applications, file source applications (for locating, opening and accessing files for sharing during a videoconference), and any other application programs that may be useful to one or more users participating in a video conference.

Web request, bridge, gateway, and server applications establish connection protocols and facilitate connection between a user and a server. Recorder and tool applications provide users with a graphical tool for enhancing their ability to communicate. Such applications include for example an electronic white board where users can create diagrams, drawings and the like such that they can be viewed and/or manipulated in real time by all the connected users. Entertainment (with examples being games of skill or chance, one or multiple player games, interactive games, media playback, and the like), gaming (with examples being legal gambling, games of chance, virtual card games, and the like), and music and video applications (with examples being video or audio playback or recorders) provide users with various types of visual or audio-based entertainment. Mapping, learning, medical diagnostic, word, and spreadsheet applications provide productivity tools for users. Finally, security applications, data organizing applications, database applications, and file source applications serve as utility applications to enhance the system's operation and performance. Notably, applications present in the described system are not limited to these examples, but instead include any and all types of software applications, and particularly those that may be of value for use by one or more attendees of a videoconference. Multiple instances of such applications may be run redundantly and distributed across a network.

Many applications in which embodiments of the invention will find utility are of a very large scale. Tens, dozens, hundreds or more users may be connected to one or more conference servers. The user computers, servers, applications and other conference resources may be widely distributed across one or more networks in a redundant fashion, with multiple instances of each resource. When a new or existing client desires to use a conference resource (with examples including joining a conference or requesting use of an application), there may be multiple instances of redundant resources that are suitable to execute their request. Determining which is the most appropriate resource can be difficult. In the prior art, often no decision was made and available resources were chosen on a random basis.

Embodiments of the present invention address these and other issues to achieve important advantages and benefits. Some embodiments of the invention are directed to providing one or more resource distribution nodes distributed across the network and that manage allocation of different resources to ensure that efficiencies are maximized. In some invention embodiments, the resource distribution nodes serve the role of traffic managers, and interface between clients and resources to determine which resource will be the most appropriate for a particular request to be directed to. In many invention embodiments, the resource distribution nodes are independent of resources—the same resource distribution node is used to direct requests to multiple different applications. This provides an improvement over traditional load balancing applications of the prior art that may have required a different load balancing node for each different application.

One example embodiment of the invention may be better described by reference to use of a resource distribution node with a presence application. Turning back to the features and functions of the presence application, the conference server 12 may run a presence application to determine which users A-F are presently connected and available for communication, and may publish or otherwise communicate a list of connected and available users A-F to each of the users A-F. Some presence applications may operate substantially continuously to indicate which users are presently connected and available for videoconferencing. In many embodiments of the invention, presence applications operate before, during and after videoconferences so that user availability data is continuously provided—not just during a videoconference. Each user may have a unique identifier, such as an IP address, code, or name. When one of the users desires to communicate with one or more of the other users, he may communicate an invitation to them over the server 12, and if the other user(s) accepts the invitation the server 12 may create a conference bridge to link the user(s). A user presence application may be used in this process.

By way of further illustration, assume that each of the users A-F registers with a user presence application (which may be running on, for example, the conference server 12) by establishing connection 14 to it and presenting a pass key, or through other steps. The user presence application then publishes a list of users available for conferencing that includes all of users A-F or a subset of those users which the requesting user desires or is allowed to communicate with (e.g., based on a defined contact lists and/or organizational security restrictions). User A desires to conduct a videoconference with users B-C, and therefore communicates an invitation to them over server 12. Both users B and C accept and communicate a corresponding confirmation to user A over the server 12. This may flow through the user presence application. The server 12 then establishes a bridge connection connecting the three users A-C to one another and each of users A-C begin to communicate streaming audio and video data to one another over the server 12.

Figure 4:
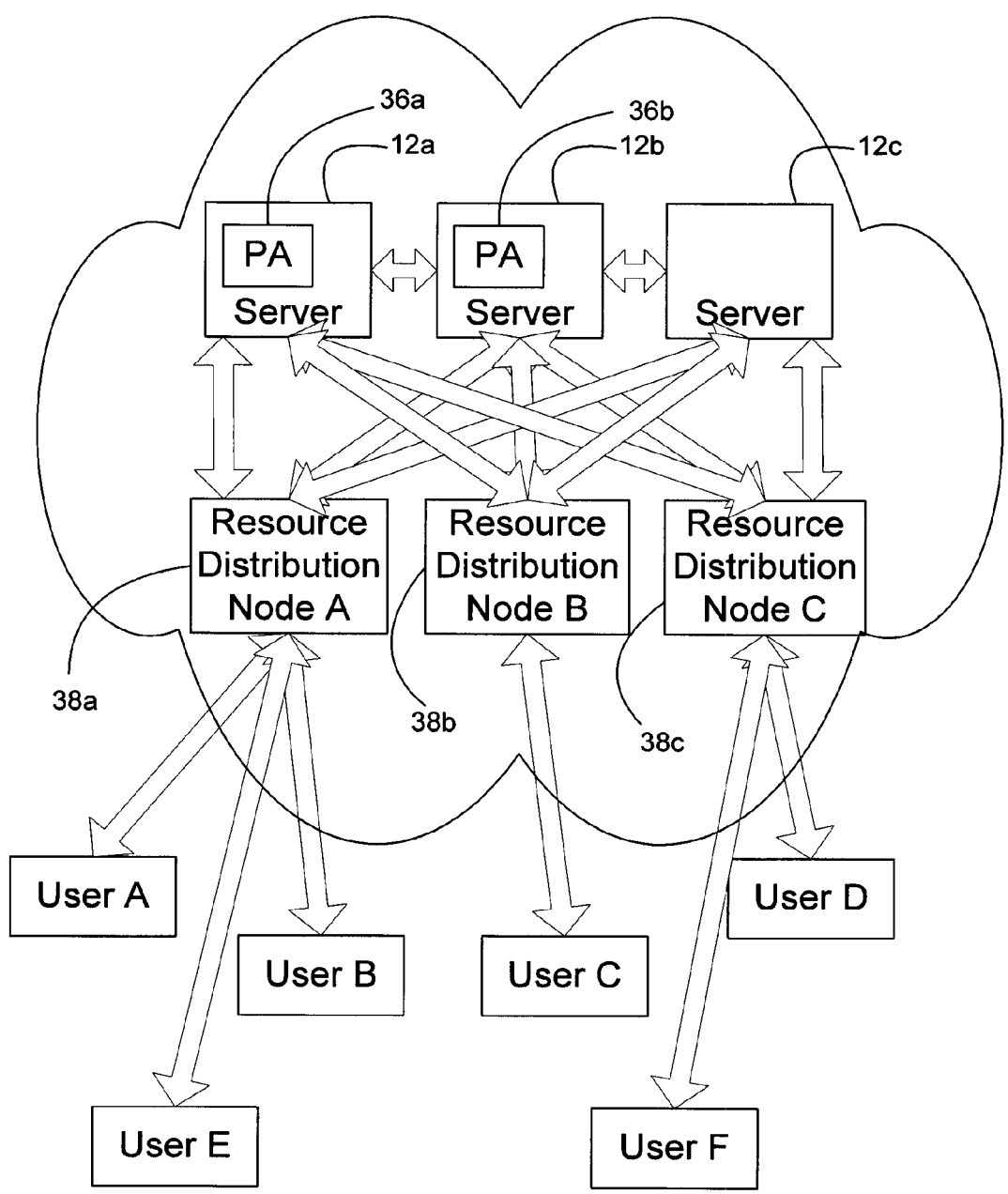
FIG. 4 is a schematic of a network practicing an example embodiment of the present invention.

Turning now to FIG. 4, to facilitate this communication and provide for efficient management of resources associated with the presence application 36, at least one resource distribution node 38 is provided. In this particular example embodiment, the system 10 includes three servers 12*a*, 12*b*, and 12*c*, with servers 12*a* and 12*b* running corresponding and redundant presence applications 36*a* and 36*b*. Notably, Server 12*c* is not running a presence application. The example system also includes three resource distribution nodes 38*a*, 38*b*, and 38*c*; each of which may be considered to be substantially identical and interchangeable with the others for practical purposes. The two presence applications 36 are redundant videoconference applications (i.e., mirror image applications) such that a user can connect to either application to facilitate the connection process without having to be concerned about whether or not one particular presence application is up to date with presence data.

The resource distribution node 38 serves as a gateway or allocation manager between the servers 12 and the users A-F. As such, if for example, a new user seeks to join a videoconference; such a request is sent first to the resource distribution node 38 rather than being sent directly to one of the servers 12. The resource distribution node 38 then determines which of the servers 12 and/or which presence application 36 is best situated to utilize for the new user and communicates this information to the user so that they can directly connect to the corresponding server 12. To make this determination, the resource distribution node 38 monitors each of the servers 12 and/or each of the presence applications 36 to determine factors that may include (but are not limited to) current load, number of users accessing, server latency, currently operating services or applications, and physical proximity to other network devices. Indeed, depending on the needs and design of the system, the decisions made by the resource distribution nodes can be based on an array of factors.

In many embodiments, the resource distribution nodes 38 may be thought of as enforcing or applying selection rules to videoconference applications and traffic thereto. In many embodiments the rules may relate to ensuring that resources are distributed efficiently with respect to the load on each. In such cases, the distribution nodes 38 can act to equally balance the load between different resources. In other invention embodiments, however, distribution nodes 38 may enforce rules that do not relate to loads. They may determine where to direct traffic to on other considerations, with examples being quality of network connectivity, physical proximity, predicted use of resources or connections, and the like. Further, in many applications different selection rules may apply to different applications and may be applied by the same distribution node.

With regard to presence services or applications 36, the resource distribution node 38 may monitor current available capacity or other factors. Each presence application 36 has a predetermined capacity in that each supports a predetermined number of concurrent connected users, depending on the availability of select system resources (e.g., memory and processor power). For example, a single presence application 36a may support some number of users, with an example being up to 5, up to 100, up to 10,000, or some other number of users. However, in the event additional users above the limit submit requests to connect to a videoconference, another instance of the server application 36b can be launched to support additional users.

Indeed, a second presence application 36 could provide for another 10,000 (or other number) of concurrently connected users. The presence applications 36 do not however need to be launched on a particular server. Indeed, as described above, each server 12 is interconnected with each other server (e.g., through a high bandwidth connection), such that a presence application 36 on one server 12 can facilitate a connection between a particular user and any server 12 in the system 10. In many (but not all) example embodiments, the presence applications 36 are fully meshed. A presence application database may operate on the network to maintain a list of the presence applications currently operating as well various parameters of each.

As described above, when a user requests to connect to a server 12, the request is communicated to the resource distribution node 38, which then may communicate with the server 12 and/or may query a database with current server 12 status stored therein. The distribution node 38 may communicate a redirect to the user with an address for a selected server 12 to communicate with included therein. In some, but not all, embodiments, the distribution node 38 avoids directly linking the user to the selected server, but instead provides information to the user so that it can directly connect. The user may then establish direct communications with the server 12.

In some other example embodiments, the distribution node 38 doesn't communicate a redirect back to the user but instead communicates directly with the server 12 on behalf of the user. Depending on the application, the former may be preferred over the latter and vice versa. For connection to a bridge for conferencing, for example, in many applications it will often be beneficial for a distribution node 38 to communicate a redirect so that the user establishes a direct connection to the server 12. This will result in relatively high burden of carrying media data including voice and audio to avoid be communicated directly between the user and server 12 to avoid congestion of the distribution node 38.

In cases in which the distribution node 38 communicates a redirect back to the user with a new connection address, the user may have communicated the initial request to the distribution node 38 over a first port. The user may subsequently connect to the server 12 using a different port.

In either case (communication through the distribution node 38 or communication directly with a server 12 following receipt of a redirect) from the user's point of view, the process may be undetected and not apparent. It may occur without their knowledge and without notice—it may occur completely in the background and "under the hood" to result in a smooth and seamless user experience.

In cases in which the distribution node 38 carries communication between the user and server 12, the user believes and operates in a manner suggesting that is simply communicating directly with the server 12 and has no knowledge of the existence or operation of the resource distribution node 38. Likewise, in cases in which the distribution node 38 issues a redirect with a server 12 address, the user/client's initial communication to the distribution node may have been treated by the user as a communication to the server. The user need not have any knowledge of the existence or location of any of the distribution nodes 38.

Notably, the location of the resource distribution node 38 is not limited in any way in the present invention. Indeed, the distribution node 38 can reside anywhere on or outside of the system 10. The resource distribution node 38 may be, for example, running on any of the conference servers 12, or may be running on other computers connected to the network 10. Dedicated resource distribution node servers, for example, may be provided that function only to host instances of resource distribution nodes 38.

Communication between the user and the resource distribution node 38 can be accomplished in one of several ways. Traditionally, when a user seeks to communicate with a server 12, the user establishes such communication by searching for the server 12 on the network 10 using the server's host name. However, since the user will at least initially be communicating with a resource distribution node 38 rather than a server 12 in some invention embodiments, a server lookup table 40 can be used to provide the appropriate destination address resulting from a user's query when it is looking for a server. When a user requests a sever 12 (for example, by submitting a host name) to the server lookup table 40, the table returns a list of at least one IP address of a resource distribution node 38 which has an established communication with the user's requested server 12.

In many example embodiments, multiple resource distribution nodes 38 are used to provide redundancy should any resource distribution nodes 38 fail, to speed response time, reduce delay, and for other reasons (including for example having multiple available resource distribution nodes for accessing). As such, in some invention embodiments a list of IP addresses associated with the resource distribution nodes 38 are returned to the user to create the initial connection between user and a suitable resource distribution node 38. Provided the nodes 38 are effectively providing redundancy, it does not matter which of the IP addresses the user decides to use as all distribution nodes 38 perform the same function. Once the resource distribution node 38 has been selected, communication between the user and the server 12 may be at least initiated or routed through the selected resource distribution node 38. In an alternative embodiment, the resource distribution node 38 can merely send a redirect message to the user that includes the IP address of the server 12 selected by the resource distribution node 38. Therefore, in these applications the user can then proceed having direct communication with the server 12. In still other embodiments, the resource distribution node 38 may forward a connection to a selected server 12 so that the server and client are in direct communication without requiring use of a redirect.

As discussed above, in applications in which the resource distribution node 38 initially selects a presence application 36 in response to user request (with an example being a request to conference with a particular users), the node 38 selects one of a plurality of available presence applications 36 based on at least one of a variety of factors. In many (but not all) example embodiments, the factors may relate to current load on the presence applications. In one example embodiment, the resource distribution node 38 selects the presence application 36 having the greatest remaining capacity among all available servers 12 in the system 10. This is useful to result in a balance of connected users across all the active presence applications 36. Notably, if no presence applications 36 have remaining capacity or if remaining capacity is below a desired limit, the resource distribution node 38 may direct and/or initiate execution of a new instance of a presence application 36. In some invention embodiments, the resource distribution node can select one of several suitable servers to launch the new application 26 on. In these embodiments when launching a new instance of a presence application 36, the resource distribution node 38 again considers the currently available resources of each available sever 12 to determine which is best suited to support a new presence application 36 (e.g., the server 12 with the most available memory, processing power, or other available resources).

It is noted that while a presence application 36 can be launched on a server 12 that is selected by the resource distribution node 38, the present invention is not limited to such a configuration. Indeed, the presence application 36 can reside on any hardware within the system 10 provided it is in communication with the resource distribution node 38. Further, the resource distribution node 38 does not necessarily select a server 12 based on the amount of available resources. Indeed, the resource distribution node 38 may use other selection parameters to select a server which has the least available system resources, but provides some other benefit to the user. Examples of other selection parameters that may be used to select a server to launch an application 36 on include, but are not limited to, geographic proximity to a data center which will be accessed by the user, suitable security clearance, currently connected users, and the like.

Although the above example embodiment steps have been illustrated using an example of a user presence application 36, it will be appreciated that as discussed elsewhere herein resource distribution nodes 38 and other steps described above may be used with other applications. Other example applications include, but are not limited to, other videoconference applications discussed above such as recorders, entertainment applications, and the like.

In some example embodiments, resource distribution nodes 38 are also configured to execute rules related to terminating unnecessary resources. For example, a distribution node 38 may monitor server applications and communicate instructions to terminate them if some termination criteria are satisfied, with example termination criteria including no use by at least one user, no connection by any user for at least some amount of time (with examples being a minute, 5 minutes, or the like), connection or use by less than some minimum threshold of users (with an example being less than 3 users), detection of a logical flag indicating it should be terminated, and the like.

In some example embodiments, the resource distribution node 38 monitors server applications and other resources either through a periodic check (i.e., at preset time intervals, with examples including every second, every 3 seconds, every 10 seconds, and others). In other example embodiments, the distribution node 38 monitors server applications and other resources when a user requests use of a particular application or resource—it only surveys applications after receiving a request from a user to connect to one of the applications. In still other embodiments, some other entity monitors or determines application status and records it in a table that is accessible to the resource distribution node 38. The node 38 then queries this table when appropriate to determine application status. In either case, if one example resource distribution node 38 discovers that an application on a server 12 is running, but enforcement of a rule calls for the application to be terminated (e.g., the application has no connected users), the resource distribution node 38 may terminate that application. Such termination may be carried out by having the resource distribution node 38 communicate a message including a termination command and the identity of the application to the server 12 hosting the application, which will execute the termination command. In other example embodiments, the server applications may self-terminate when they are not in use. Notably, the resource distribution node will detect such termination during its routine check as described above.

As another example, instead of terminating an application, the resource distribution node 38 may direct that users connected to one server 12 or other resource to disconnect therefrom and to connect to a different but interchangeable server 12 (or interchangeable resource) to balance the usage among servers. Consider for example, a first application 36 on a first server 12, where the first application has low usage from connected users. Consider further that a second redundant application (i.e., the same application as the first) is being run a second server 12 and has relatively high usage from its connected users. As one example resource distribution node 38 monitors these servers, it identifies the imbalance of usage between redundant applications and moves at least one user currently connected to the second application (on the second server) to the first application (on the first server). The resulting effect is a more balanced system since it reduces the likelihood that any single server will support an unnecessary proportion of the total system's usage.

The node 38 may cause users to move in any of a number of steps. In one example set, the node 38 may determine which users are connected to the "busy" server application and communicate instructions to that server application to disconnect some desired list of one or more users. The node may simultaneously (or within a suitably short amount of time) communicate a redirect or other message to that list of one or more users with the address of the second "less busy" server application. In some embodiments no redirect is communicated, and instead this process may be completely transparent to the users. In these applications, for example, the resource distribution node 38 may communicate instructions to the busy server application to transfer its connection to the less busy server application. Or, the node 38 may otherwise cause the connection to be shifted from the busy application to the less busy application.

As applied to several of the examples above, the resource distribution nodes 38 monitor the cumulative users associated with each presence application within the system 10 and the associated resources of the servers 12 using one of several techniques. In one embodiment, the resource distribution nodes 38 query the servers 12 (which run the presence applications) to form a list of applications currently running or that the server is capable of running, connected users to each, and the particular resources being allocated to each server 12. Such queries may be performed repeatedly and periodically so as to reduce synchronization issues. For example, in the example embodiment, queries are performed at least every three seconds. Notably, defining a period which is too great can result in multiple applications not being truly redundant. Indeed, if five users are added to a first application at the beginning of a long time period, there could be a substantial amount of time (the time remaining in the predefined period) that would pass before a second application is updated to reflect those added five users. The result could cause improper balancing as an application/server could be selected based on an application's recently outdated information. As such, it is preferred that such periods are short. Alternatively, or in addition to the described embodiment above, the resource distribution node may query servers at the time that a resource allocation decision needs to be made (i.e., when a request is received from a user and the resource distribution node needs to determine where to forward or redirect it to).

As noted above, server applications are not limited to presence applications 36. Further, notably the resource distribution node 38 is not limited to managing resources for a single server application. Indeed, the same resource distribution node 38 can be used in the manner described above with a presence application with any number of additional applications and can do so simultaneously. For example, a single resource distribution node 38 could receive multiple requests from a first user for multiple different applications. In response, the node 38 could direct the first user to a video conference recorder application on a first server, to a videoconference gateway application on a second server, and to a videoconference whiteboard application on a third server. In this manner, resource distribution nodes of some invention embodiments are not limited to use with any single application, but instead can be used with a variety of different applications.

Indeed, as noted above, benefits and advantages of some invention embodiments include that they scale exceptionally well. Utility may increase with larger numbers of different applications. In addition to presence applications, other videoconference applications that distribution nodes of the invention may operate on include, but are not limited to, web request applications (for accessing internet pages during a videoconference), bridge applications (for linking videoconference users to one another), gateway applications (for facilitating access to locations or resources), recorder applications (for recording video, audio or other media during a videoconference), tool applications (for providing various software tools during a videoconference), entertainment applications (including but not limited to audio/video playback applications), gaming applications (including but not limited to single and multi-player games of skill or chance, virtual games, and the like), mapping applications (for mapping geographic or other locations, providing satellite imagery, providing driving instructions, and the like), learning and educational applications, medical diagnostic applications, word processing applications, spreadsheet applications, security applications (such as user authentication applications), data organizing applications, database applications, file source applications, and any other application programs that may be useful to one or more users participating in a video conference.

In an example embodiment, the location of each active application and its associated resource usage is determined by the resource distribution nodes 38 which periodically survey the system 10. Each of the different nodes 38 surveys all of the servers 12 and all of the applications running thereon so that each maintains a current knowledge of global status. Similar to the technique described with respect to the presence application, this survey is performed periodically so as to avoid synchronization issues, with example periods including not greater than 1 second, not greater than 3 seconds, not greater than 5 seconds, and others. In an alternative embodiment, a survey of the applications and associated resources is only performed when the resource distribution node 38 receives a request for an application from a user or upon some other defined trigger event. The latter approach is generally preferred when the system 10 has a relatively small number of user requests. In some embodiments the current status results of a survey are recorded in a data table for future reference by the resource distribution node, by other resource distribution nodes, or by other entities.

Figure 5:
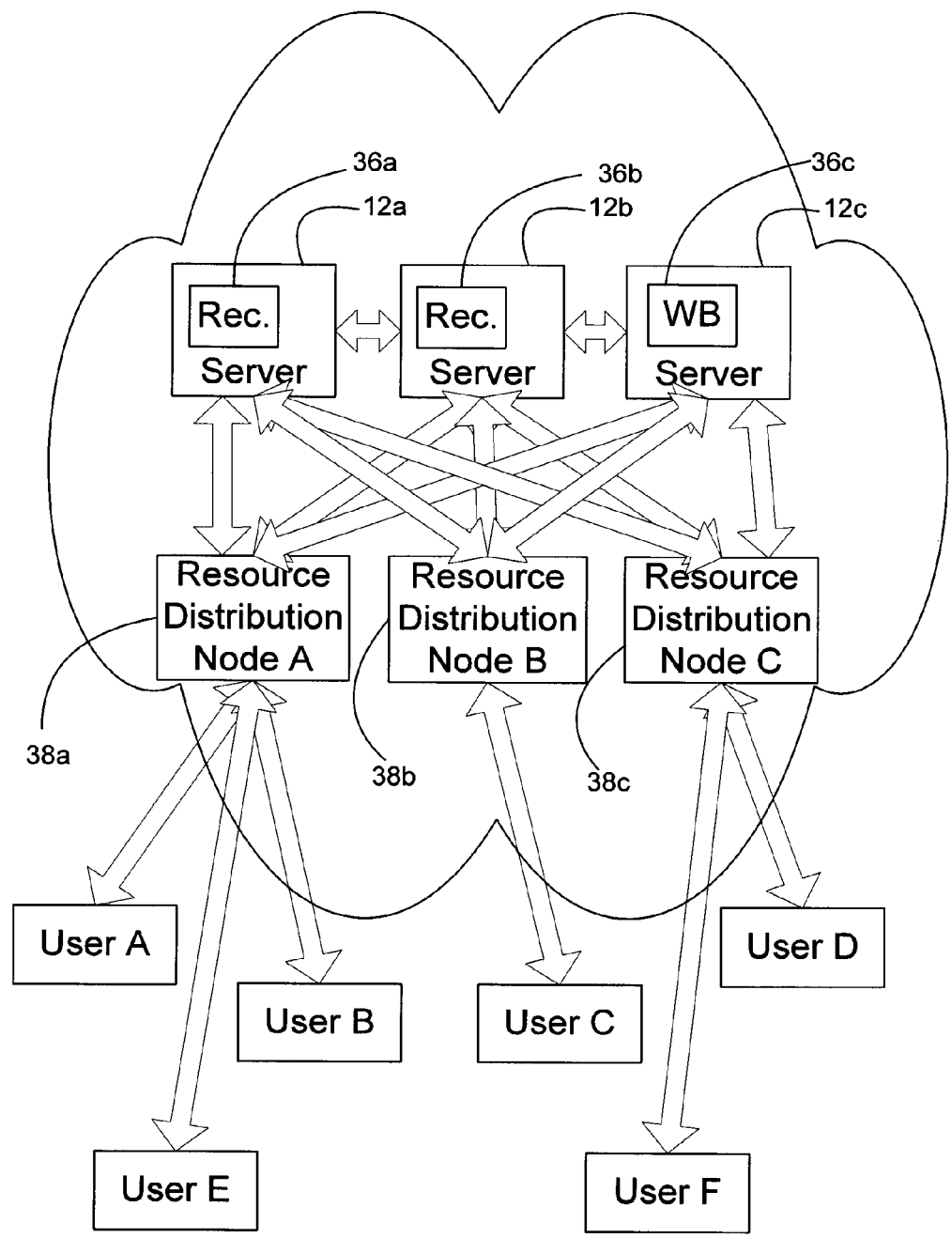
FIG. 5 is a schematic of a network practicing an alternate example embodiment of the present invention.

Several further example embodiments will now be described in connection with the figures to describe still additional aspects of invention embodiments. Referring now to FIG. 5, in this example embodiment, the server application 36 sought by the user A is a videoconference recorder application useful to record one or more video, audio and other data streams being communicated during a videoconference. One recorder application 36*a* is being run on a first server 12*a* and a second redundant recorder application 12*b* is being run on a second server 12*b*. The third server 12*c* does not have a recorder application, but instead has a whiteboard application 36*c*. Consider user A requesting a recorder application 36 by communicating a request for recording to the resource distribution node A 38*a*. In this example embodiment, when such a request is made, the resource distribution node A 38*a* surveys the servers 12 in the system 10 to determine which ones are running recorder applications 36. Once it is determined that servers 12*a* and 12*b* are running such applications, the resource distribution node A 38*a* analyze the usage or utilization of system resources by each recorder application 36. For the purposes of this example, presume the first application 36*a* has the least usage. As such, the resource distribution node A 38*a* will send a redirect message back to user A to facilitate user's connection to the first recorder application 36*a* running on the first server 12*a*.

Figure 6:
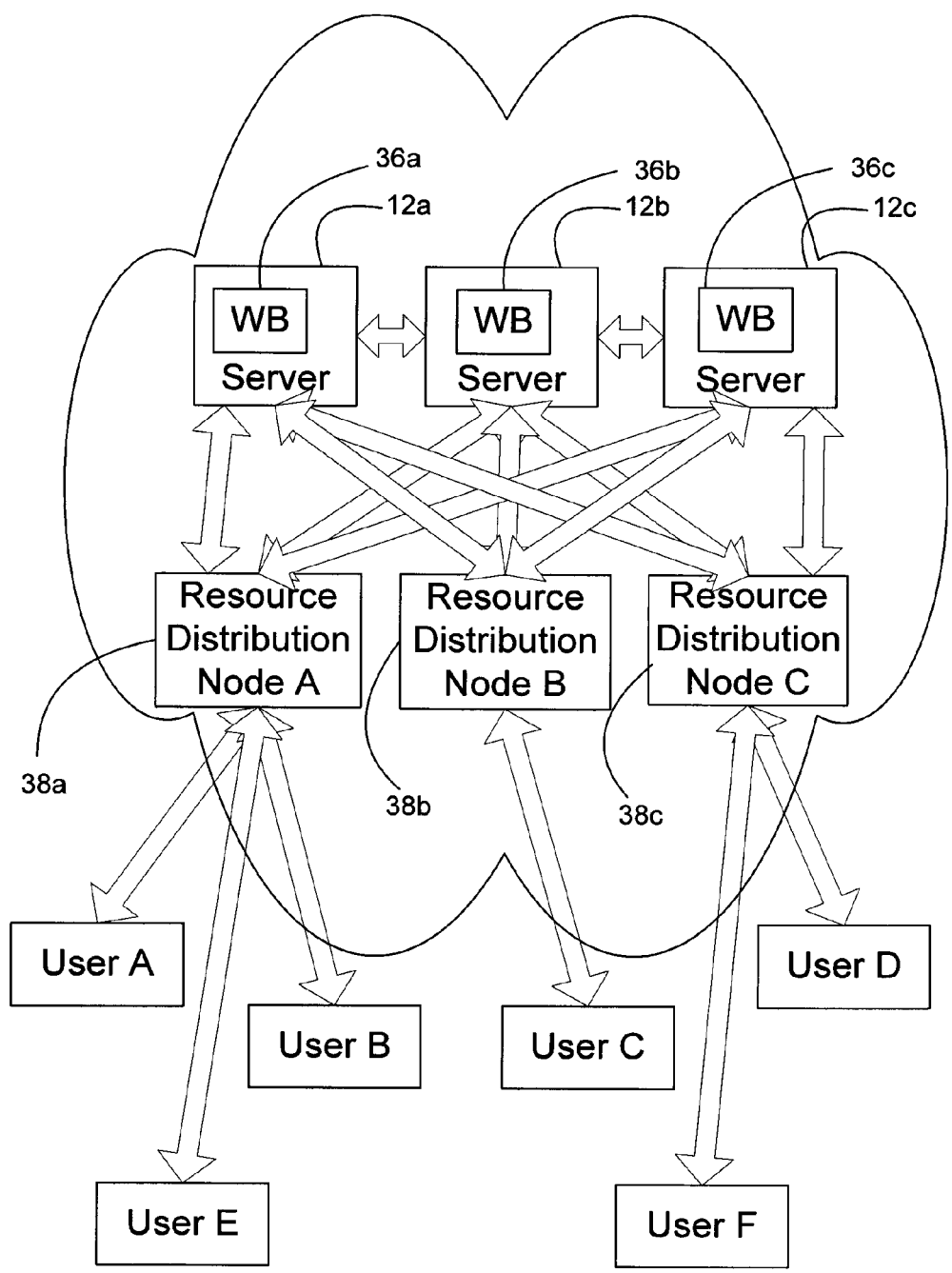
FIG. 6 is a schematic of a network practicing an alternate example embodiment of the present invention.

Referring now to FIG. 6, in this example embodiment, the server application sought by the user A is a whiteboard application. In this example, each server 12 runs a separate, but redundant whiteboard application 36'. As is appreciated in the art, a whiteboard application can be useful during a videoconference to be manipulated by one or more participants for showing drawings or other data to all other videoconference users. The resource distribution nodes 38 are configured to run a periodic survey of the servers as described in greater detail above to obtain a current global status of all servers and applications 36' (as well as other applications running on the servers 12). As such, the resource distribution nodes 38 maintain a periodically updated list of which servers are running which applications, the corresponding use of system resources for each application, and other information. The nodes 38 may store such current status information in a local non volatile memory, in some applications in the form of a data table. Notably, many whiteboard applications consume significant processor time and memory. As such, when user A requests to be connected to a whiteboard application 36', the resource distribution node A 38a queries the locally stored current status information to determine which whiteboard application 36' is currently best suited for use by the requesting user. The node A 38a then sends a redirect message to user A with the identification of the server 12 having the greatest available processor time and memory. Since periodic surveying is performed by the resource distribution node 38, no separate surveying and/or analysis of the servers needs to be done at the time the request is made. Instead, the resource distribution node 38 relies on the data most recently obtained as part of the survey process which is stored and retrieved by the node A 38a from a local memory.

Figure 7:
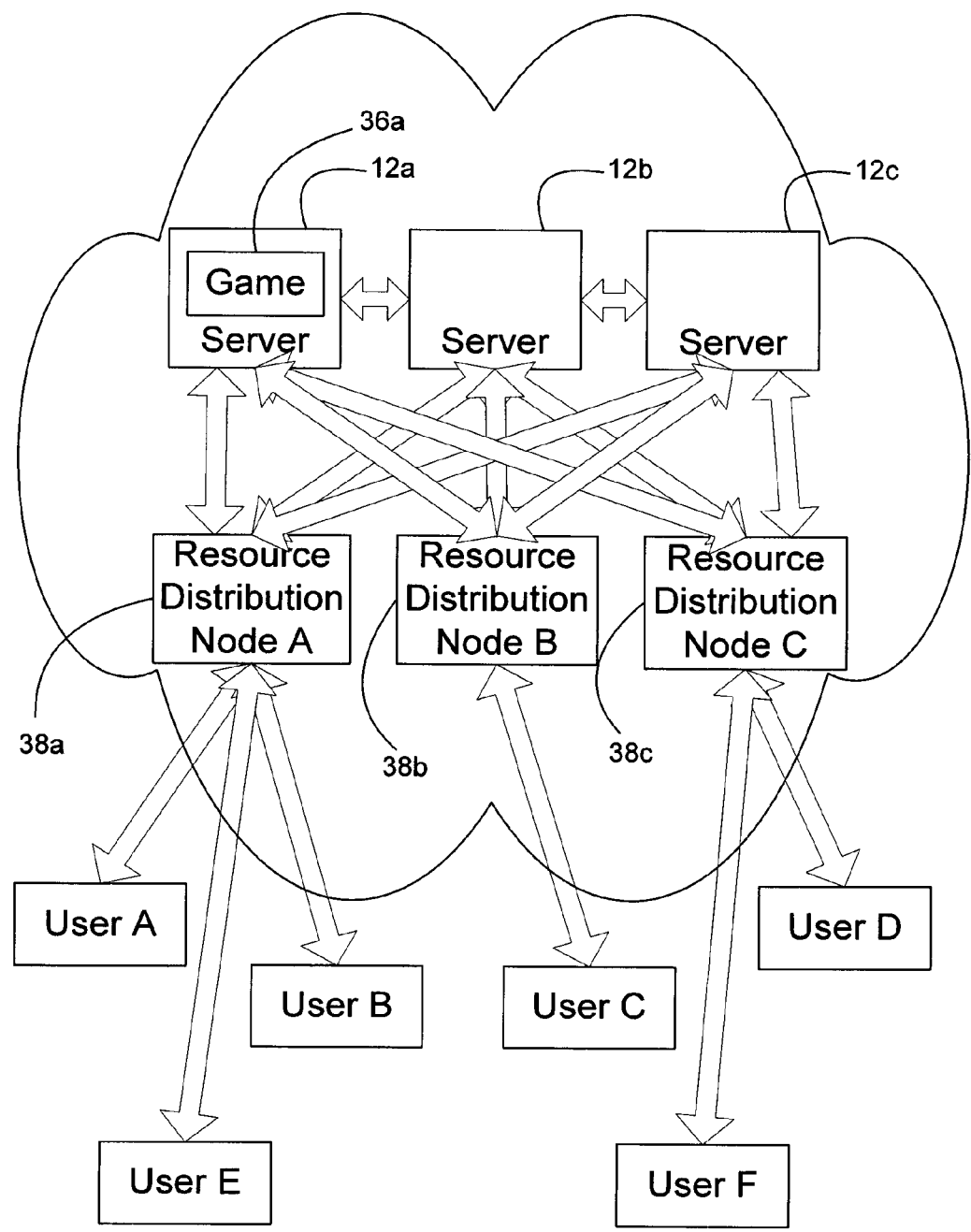
FIG. 7 is a schematic of a network practicing an alternate example embodiment of the present invention.

Referring now to FIG. 7, in this example embodiment the server application sought by the user A is a gaming application. Gaming applications may include, but are not limited to, applications in which one or more players compete with one another or with a computer or virtual players in games of skill or chance. Some examples include war games, sports games, card games, gambling games, virtual experience games, legal gambling games, legal wagering applications, and the like. In this example embodiment, only the first server 12a runs a gaming application 36a". However, the system resource allocation for this application is high.

When user A desires to use a gaming application, it may consult a look-up table or other data structure that correlates an application name or other identifier with the network address for the node 38a. The user a then communicates a request for the application to the address for the node 38a. When the resource distribution node A 38a receives the request, it surveys each server and determines that due to the high resource utilization by the gaming application 36a" on the first server 12a, a new instance of that application should be launched. The resource distribution node A 38a then surveys the remaining servers 12b and 12c to determine which server can best accommodate a new gaming application 36a". For this example, assume that the second server 12b has more available processor and memory resources, and/or fewer connected users than the third server 12c. As such, the resource distribution node A 38a sends a message to the server 12b that includes instructions to launch a new gaming application 36a". The server 12b responds by launching a new gaming application 36a" and communicates a confirmation to the node 38a that includes the address for the new gaming application 36a". After receiving the confirmation from the server 12b, the resource distribution node A sends a redirect message to user A which includes the address data of the new application 36a" to the user A to facilitate the connection between user A and the newly launched gaming application on the second server 12b.

Figure 8:
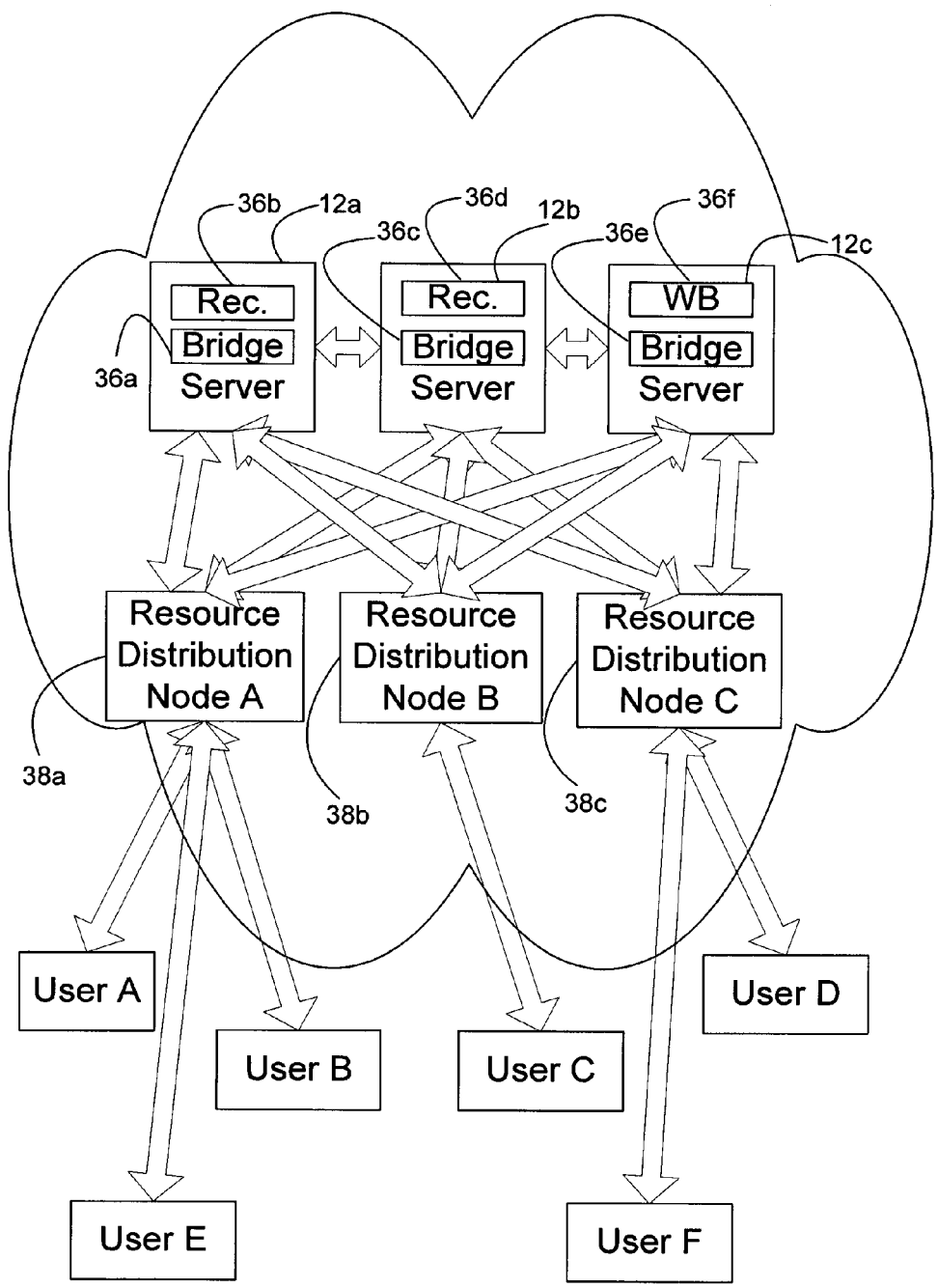
FIG. 8 is a schematic of a network practicing an alternate example embodiment of the present invention.

Referring now to FIG. 8, in this example embodiment, user A seeks to join a conference and run a recorder and a whiteboard application at the same time. Included in this example system is a first server 12a having a bridge application 36a and a recorder application 36b, a second sever 12b having a bridge application 36c and a recorder application 36d, and a third server 12c having a bridge application 36e and a whiteboard application 36f. When the requests are made from user A to resource distribution node A 38a (which may include a single request specifying the need for a bridge, recorder and a whiteboard, or may be made in three separate requests), the distribution node A surveys each server 12 to determine the best one for connecting the user A to each application. For example, the distribution node A could determine that user A should connect to the bridge application 36a and the recorder application 36b, both on the first server 12a, and the whiteboard application 36f on the third server 12c. In this example, the second server 12b does not get used. Also, the node A could determine that one application on each of the three servers 12 is most appropriate for use.

As discussed above, the distribution node A may select particular applications for use by user A on a basis other than processor, memory or other resource availability. For example, the node A may determine that it is most efficient to select a recorder application that is running on the same server as the conference bridge being accessed. A recorder application may require access to video and audio data streams, and even if a recorder application on a first server has a high usage rate it may be more efficient to use that recorder if the conference is being bridged over that first server than it would be to use a recorder on a second server that had a lower use rate.

Whichever particular applications are selected, the distribution node A communicates one or more redirect messages to the user A with location data for the applications. Since multiple applications are being surveyed and connected to by user A, the redirect information may be included in a single redirect or other message (i.e., one message is sent to user A redirecting him to both servers 12a and 12c for the corresponding application). However, notably, the invention is not so limited. Indeed, separate message could be sent depending on the configuration of the system 10.

As noted above, the resource distribution node 38 can select one of multiple redundant applications based on factors other than resource usage. Resource distribution nodes 38 may have any of a variety of pre-determined selection parameters to apply in selecting an application. Indeed, a server may be selected because of its proximity to a particular data center for which the user is likely to access (even if the system recourses on the server were low) or for other reasons. As such, in some (but not all) invention embodiments, resource distribution nodes 38 can provide for selection of a server which would be dismissed under a load balancing decision making technique. Further, as illustrated above, a single distribution node may apply different rules for different requests—it may assign a bridge to a requesting user based only on load considerations, while it assigns a recorder based on considerations of proximity to the bridge being used.

As another example, a distribution node can assign a bridge to a requesting user based on which server (if any) is already running a bridge for the associated meeting. This decision making greatly simplifies bridging and improves overall efficiency of processor and bandwidth utilization. However, such a technique may not always be desired since it may diminish overall network performance. The distribution node can also distribute users amongst presence applications based on which users are most likely to communicate with each other. Notably, it is greatly more efficient to have users that communicate with each other frequently be logged-in to the same server.

In some invention embodiments, the resource distribution node 38 further provides the feature of facilitating the disconnection of users from a server 12 that goes offline. In traditional video conference systems, when the server hosting the videoconference goes offline, a large number (i.e., all) of the previously connected users drop their connection at one time. As a result, all the users that have been simultaneously disconnected may attempt to reconnect (i.e., using a new server) at approximately the same time. This typically results in a tremendous demand of system resources in a short period of time, which is often difficult for a system to handle. Further, since videoconference systems depend on real-time activity, lagging of any portions of the system is often considered intolerable if effective communication is to be provided. A poor user experience may result if an unexpected disruption of conferencing connectivity occurs.

Figure 9:
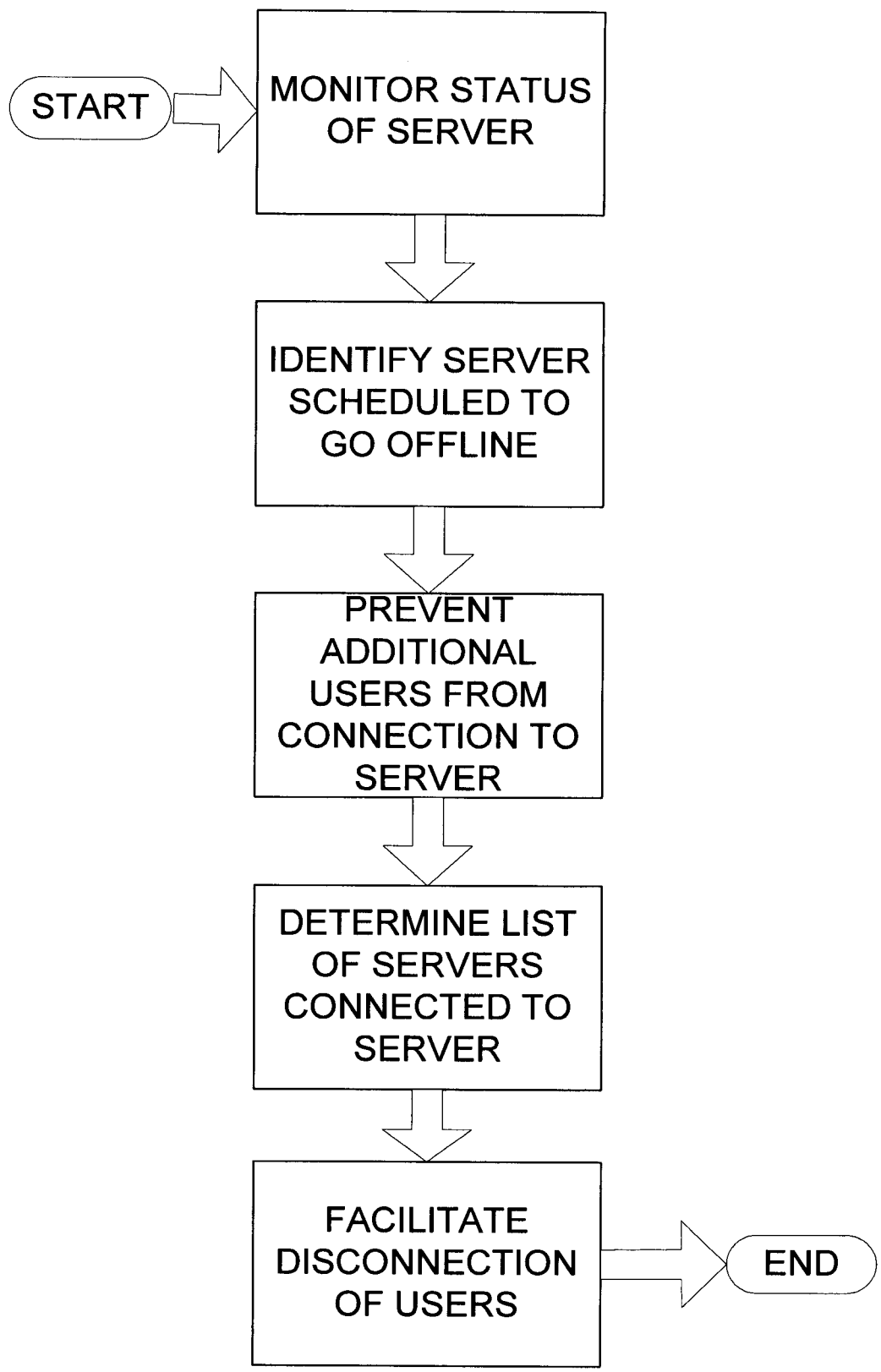
FIG. 9 is a flow chart showing operation of a resource distribution node of an example embodiment of the present invention.

Referring now to FIG. 9, in some example embodiments of the invention the resource distribution node 38 reduces or eliminates such reconnection issues by gradually facilitating the disconnection of users connected to a server that is going off-line for maintenance, upgrading, or for other reasons. A resource distribution node 38 may monitor (step 100) the status of all servers on a conferencing network to determine whether a particular server is going offline. A server may communicate a message indicating when it is going off-line, may change a logical flag, or may otherwise indicate to the node 38 that it is going off-line. When such a server is identified (step 102), the resource distribution node 38 ensures that no additional users connect to the server 12 (step 104). This may be accomplished in any of a number of ways, with an example being removing this server from a list of available servers so that any future request from a user to connect thereto will result in directing the user to another user (step 106). In one example embodiment, when the resource distribution node 38 polls the servers 12 (i.e., when it is making distribution decisions), the distribution node verifies whether each of the servers is operational. In this embodiment, the resource distribution node 38 will not direct users to any servers 12 that are not in the externally-supplied table or that are in that table but which have not been verified as being operational.

Next, the resource distribution node 38 determines (step 108) a list of users connected to the server 12 and facilitates the sequential disconnection of users (step 110) over a period of time until all users have been disconnected from the server. By gradually disconnecting these users, the example invention embodiment ensures that all the users will not disconnect (and attempt to reconnect) simultaneously. In one embodiment, the resource distribution node 38 facilitates the disconnection of users by sending a message to the server to carry out the disconnection process. Also, notably the period of time over which the users are gradually disconnected is adjustable depending on the size and conditions of the system 10, but in some example embodiments, users are disconnected over a period of at least one half, at least one, and at least three minutes. Further, in some invention embodiments the users are disconnected in groups, which may be substantially even in number (e.g., twenty total connected users may be disconnected in five sequential groups of four, four sequential groups of five, two sequential groups of ten, etc.), so as to generally balance the reconnecting activity.

Notably, if there are users who are connected to a conference bridge (rather than being connected to actual applications on the server), in some invention embodiments their connection to the bridge is not terminated. Instead, the resource distribution node 38 waits until such users voluntarily end their videoconference session and then terminates their bridge connection. This can be desirable, for instance, to avoid disrupting the conferencing connectivity. Connections to applications on the server with examples being gaming, recorders, and the like, however, may be gradually disconnected since these are not deemed critical.

Once all users have been disconnected from the server 12, the resource distribution node 38 causes the server 12 to move to an offline status. Since users are typically configured to attempt to reconnect as soon as a connection is lost, using this technique allows the disconnected users to reconnect to new servers gradually, thereby reducing the harmful impact on the system as discussed above. While several steps of this example embodiment have been described as being performed by the resource distribution node 38, notably the steps can be performed by any component within the system 10 and need not be limited to execution by the resource distribution node.

Figure 10A:
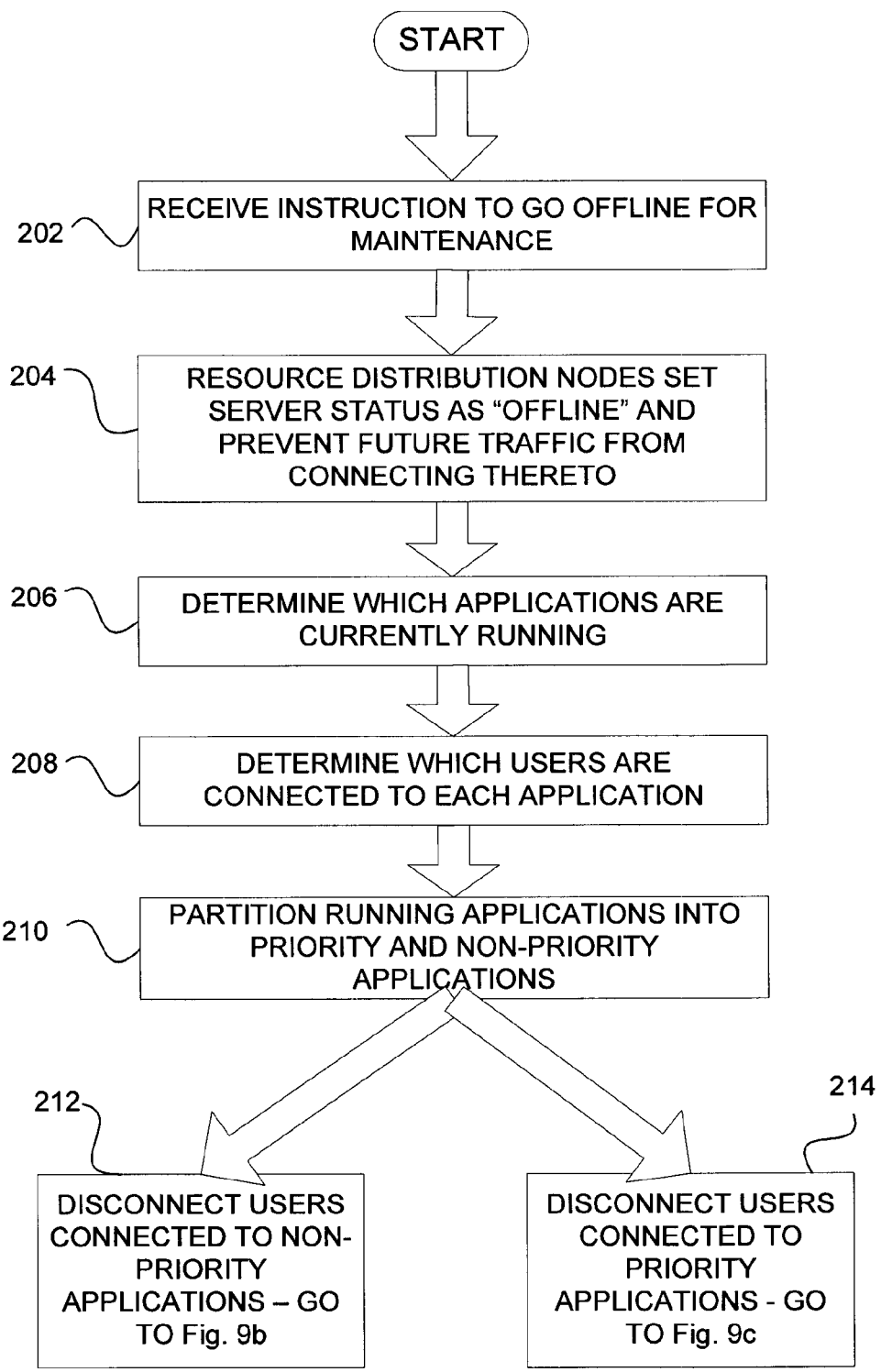
FIG. 10 is a flow chart illustrating an additional embodiment of the invention.
Figures 10B, 10C:
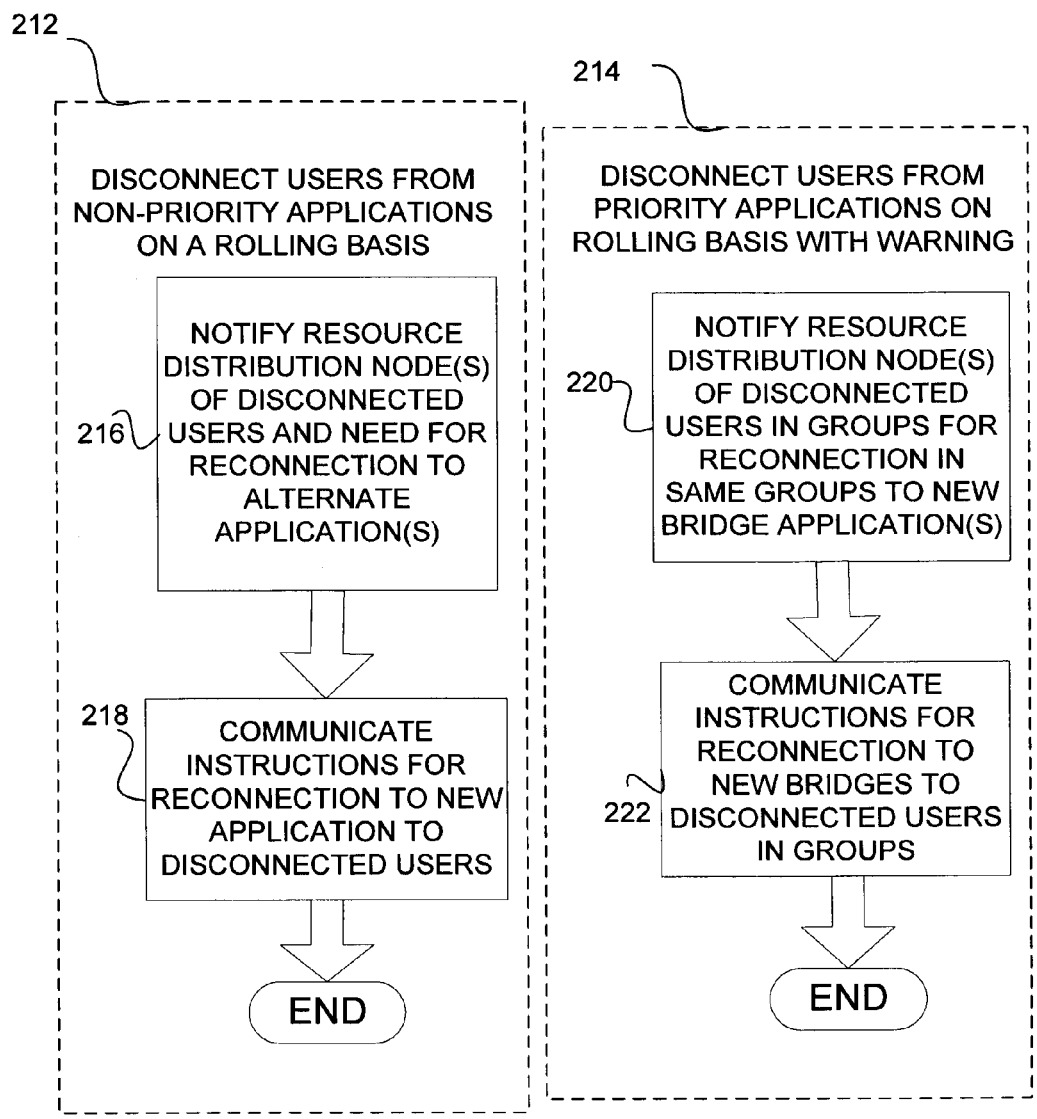

As an example, a standalone videoconference maintenance node or program product may be provided to perform these steps, or various existing program products running on one or more of the servers 12 may be provided with this functionality. A videoconference server maintenance program product may include instructions stored in a non-volatile memory (as described above with regard to other program products) that cause one or more of the servers to carry out these steps. By way of further illustration, the flowchart of FIG. 10a-c is provided to illustrate one such example embodiment of a videoconference server maintenance program product (which may also be used to illustrate an example system or method embodiment).

At block 202, an instruction to go offline for maintenance (or for other reasons) is communicated to a conference server (which may be, for example, any of the servers 12). The communication may be generated by an administrator, by a user, by a distribution node 38, or from another source. In a subsequent step, the resource distribution nodes set the status of the server as "offline" and prevent further traffic from connecting thereto. Block 204.

This may occur as the various distribution nodes do periodic surveying of the servers. An offline server may have a logical indicator or other data posting indicating to the node that it is offline. Or, in other embodiments, the offline server communicates a message to the distribution nodes indicating its offline statue. The distribution nodes can record the offline status of the corresponding server in a local memory, and will not send any future traffic to that server.

A step of determining which videoconference applications are currently running on the server is then performed, followed by a step of determining which users are connected to (or using) each application. Blocks 206, 208. The step of determining which users are connected to which applications may be performed, for example, by querying a presence node 36, a database stored in a local or networked memory, or the applications themselves.

The example embodiment then partitions running applications into two categories which for convenience are identifies as "priority" and "non-priority" applications. Block 210. The distinction between the two applications can vary based on differing factors. In many videoconference applications, however, non-priority applications are those that are not critical to the videoconference. They may include, for example, whiteboard applications, document exchange applications, recorder applications, gaming applications and the like. In some embodiments a step of identifying the no-priority applications includes consulting a list that identifies which are priority and which are not. Other example steps include identifying any application that has only intermittent use, limited connectivity, or significant periods of idleness as non-priority.

In many example embodiments priority applications are those that are critical or important to the videoconference.

One typical example is the conference bridge application itself. When the bridge over which users are exchanging audio and video is disconnected, the conference will clearly be disrupted.

The example embodiment then proceeds to carry out disconnection of users connected to the non-priority and priority applications. Blocks 212, 214. Disconnection steps carried out for these two classes of users are different. FIG. 10*b* illustrates one set of example steps for disconnecting users from non-priority applications (FIG. 10*b* collectively represents block 212). As explained above, in some embodiments this is performed on a rolling basis to avoid excessively taxing the system. As used in this context, rolling basis refers to a gradual, intermittent or staggered disconnection. For example, if 1,000 users are connected to a non-priority application, users may be disconnected in 10 groups of 100, 20 groups of 50, four groups of 250, two groups of 500, 100 groups of 10, and the like. The groups need not necessarily include even numbers of users, although for convenience this may be done.

The period of rolling basis disconnection can vary with application, system status, number of connected users, and other factors. In some embodiments, the period may be at least 5 seconds, at least 10 seconds, at least 30 second, or at least 45 seconds between groups. Larger time periods may be useful for larger group sizes, and shorter for smaller group sizes. A step is also performed of notifying one or more resource distribution nodes of the disconnected users before, at the time of, or shortly after their disconnection and the need to reconnect them to a new identical application. Block 216. The resource distribution node determines a most suitable new application for connecting each user to, and communicates instructions to them to reconnect. Block 218.

Users disconnected from a single application may be reconnected to any number of identical applications running on the system. Also, in some embodiments the process of block 212 occurs without any indication or knowledge on the part of the disconnected users—there is no interruption of their service. This can be practiced in particular on non-priority applications that have only intermittent use, with an example being a whiteboard application. Status of the disconnected users may also be communicated to the new application so that the user does not lose stored information or status. In other example embodiments, some notice is communicated to affected users, with an example being "you may have a temporary disruption in your whiteboard application—we request your patience" prior to termination.

Users connected to priority applications may be disconnected on a delayed basis to allow for a less disruptive interruption of service. In some embodiments, no disconnection occurs at all, and termination of the priority applications is allowed to occur in a natural progression as users stop using the priority application. In other example embodiments, some initial time period is provided to allow for natural termination of connection, and if it does not occur, automated disconnection is begun. Example periods of time include 5 minutes, 10 minutes, and 30 minutes. In other example embodiments, no disconnections of any priority applications are begun until all non-priority applications have been completed.

FIG. 10*c* (which collectively represents block 214) illustrates steps of still another example embodiment of priority application disconnection. In this embodiment, multiple instances of priority bridge applications are operating on the server. Unlike non-priority applications, it is often not practical to do rolling, staggered disconnection from a priority bridge application since all users need to be connected to the same bridge in order to see and hear each other. In this application, complete disconnection of each instance of a bridge application is carried out, but the different instances of the bridges are staggered. That is, a first bridge is terminated and all users connected thereto connected to a single instance of a new bridge as described above through use of a distribution node, after some period of time (with examples including 30 seconds, 1 minute, 3 minutes, and other) a second bridge, then a third, etc. This avoids taxing the overall system with a high number of users needing reconnection at one time.

In this embodiment, the distribution nodes are notified of which users need to be treated as a group and re-connected to a single new bridge. Block 220. This allows for entire conferences to be moved to a new bridge. Again, this may occur in a transparent manner to the affected users, who may experience only a very brief (which in some cases may not be noticeable) disruption of connectivity. In other embodiments, including that illustrated by FIG. 10*c*, steps of providing prior warnings to the affected users are performed to avoid a surprising disruption. The steps may include communicating a message to users that "your connection will terminate in—minutes (or seconds), but you will be momentarily reconnected." In some embodiments a countdown timer to disconnection may be provided. In some embodiments, conference settings are communicated to the distribution node for forwarding to the new bridge so that the newly established conference shares settings with the prior conference. Instructions are then communicated to the affected users for reconnection to the new bridges. Block 22.

The various steps of the embodiment of FIG. 10 may be altered and otherwise modified. Also, as explained above, they may be performed by various different program products, various different portions of one or more program products, or different elements of the videoconference systems. As an example, all or some of these steps may be carried out by a stand-alone videoconference maintenance program product, by one or more of the distribution nodes, or by a master videoconference server program. Some steps may be carried out by a distribution node while others are carried out by a maintenance program.

Notably, the above-described disconnect mechanism can also be used in conjunction with client software programmed to respond to disconnects by waiting for a predetermined period of time before reconnecting. In one example embodiment, such a time period is determined at run-time using a random number generator algorithm to further reduce the strain caused by all clients reconnecting simultaneously.

Applications of the invention may include deployment of a plurality of resource distribution nodes. Such deployments may be particularly useful in cloud or other widely dispersed server applications. In such deployments, the plurality of resource distribution nodes may or may not communicate with one another. In some such deployments, each of the resource distribution nodes maintains a global knowledge of the plurality of servers, services and other operational aspects. In these embodiments, it is not necessary for the resource distribution nodes to communicate with one another—each essentially has the same information as all others. In some other embodiments, however, one resource distribution node may be responsible for one portion of a distributed network and be in communication with other resource distribution nodes that are each responsible for other specific portions of the network.

In some embodiments of the invention resource distribution nodes may also have the functionality of monitoring server and application/service usage across a plurality of conference servers, and of issuing instructions to launch or destroy instances of servers or applications/services as appropriate. As an example, a resource distribution node may monitor a plurality of conference servers and presence applications and note at some point in time that one server and one presence application have zero usage. The resource distribution node may issue instructions to destroy each instance that have zero usage to conserve resources. If the resource distribution node in other conditions determines that one or more conference servers or applications/services are reaching capacity, it may also issue instructions to launch new instances of the server/application/services to accommodate future needs. In this manner, some embodiments of the resource distribution nodes include logic for monitoring usage and/or capacity, making decisions regarding the adjustment of the same, and issuing instructions to cause capacity to increase or decrease through launching or destroying new instances of resources.

Those knowledgeable in the art will appreciate the broad scope of the present invention as claimed below and that the representative collaboration event and video conference system, method and program product examples discussed herein are illustrative only. It will further be appreciated that many variations are possible within the scope of the invention as claimed herein below. The sequence of steps and arrangement of hierarchical levels of the example embodiments illustrated herein and in corresponding flowcharts, for example, could easily be altered. Also, some steps, parameters, and other elements may be omitted and others substituted. Equivalents to the steps and elements recited will be apparent to those knowledgeable in the art. Variable, file, level, set, and other element names have been used herein for convenience only, and these names should not be interpreted in a manner that unduly limits the invention.

What is claimed is:

1. A videoconference system in which a plurality of users communicate video and audio data to each other, the system comprising:
    at least two conference servers each having a plurality of users linked to one another over the server wherein the plurality of users can share real time audio and video data with one another, said conference servers being in communication with each other;
    a plurality of redundant videoconference applications configured to run on said at least two conference servers, and
    at least one resource distribution node configured to determine in response to a request for access to one of said videoconference applications a selected of said plurality of redundant videoconference applications to utilize,
    wherein said plurality of redundant videoconference applications includes at least one presence application configured to facilitate a communication connection between one of said plurality of users and one of said at least two conference servers, each of said at least one presence application having a predetermined capacity defining a number of potential concurrent connections, and
    wherein each said resource distribution node determines the capacity of each said presence application and if said resource distribution node receives a request from a user to connect to a presence application, said resource distribution node directs said requesting user to one of said at least two conference servers which is configured to run the presence application having the greatest available capacity.

2. The videoconference system of claim 1 wherein said plurality of redundant videoconference applications further includes at least a web request application, a bridge application, a gateway application, a recorder application, a tool application, a gaming application, and a file source application.

3. The videoconference system of claim 1 wherein the resource distribution node facilitates a communication connection between said resource distribution node and said conference server which is configured to run said presence application having the greatest available capacity.

4. The videoconference system of claim 1 further comprising a presence application database identifying each presence node application running on said at least two conference servers and wherein the capacity of each said presence application is determined by querying said presence application database.

5. A videoconference system in which a plurality of users communicate video and audio data to each other, the system comprising:
    at least two conference servers each having a plurality of users linked to one another over the server wherein the plurality of users can share real time audio and video data with one another, said conference servers being in communication with each other;
    a plurality of redundant videoconference applications configured to run on said at least two conference servers, and
    at least one resource distribution node configured to determine in response to a request for access to one of said videoconference applications a selected of said plurality of redundant videoconference applications to utilize,
    wherein said resource distribution node determines the capacity of each said videoconference application and if said resource distribution node receives a request from a requesting user to use a videoconference application and said resource distribution node determines that currently running instances of said application do not have sufficient available capacity, said resource distribution node launches a new instance of a corresponding application and directs said requesting user to said new instance of said application.

6. The videoconference system of claim 5 wherein said new instance of said application is launched on a first server, and wherein distribution node applies selection parameters to identify said first server to launch said new instance of said application on, and wherein said requesting user is already connected to a different videoconference application on a second server.

7. The videoconference system of claim 5 wherein said request originates from a requesting user, and further including the steps of said resource distribution node applying selection parameters to determine said selected videoconference applications to utilize, and of said resource distribution node communicating a redirect message to said requesting user including the location of said selected videoconference application.

8. The videoconference system of claim 5 wherein said resource distribution node repeatedly and periodically determines the status of each said plurality of redundant videoconference applications, store the results of said repeated and periodic determinations in a memory, and queries said memory in response to receiving said request to access in order to determine said selected videoconference application.

9. The videoconference system of claim 5 wherein said resource distribution node monitors said plurality of redundant videoconference applications, applies termination criteria to identify any of said plurality of videoconference applications to terminate, and terminates any of said videoconference applications that satisfy said termination criteria.

10. The videoconference system of claim 5 wherein if said resource distribution node receives a request from a requesting user to connect to one of said at least two conference servers, said resource distribution node determines at least one recipient user who the requesting user seeks to communicate with, and directs said requesting user to a conference server associated with said recipient user wherein the requesting user is linked to the recipient user over the conference server associated with the recipient user, and wherein the requesting user and recipient user communicate real time audio and video data to one another.

11. A videoconference system in which a plurality of users communicate video and audio data to each other, the system comprising:
   at least two conference servers each having a plurality of users linked to one another over the server wherein the plurality of users can share real time audio and video data with one another, said conference servers being in communication with each other;
   a plurality of redundant videoconference applications configured to run on said at least two conference servers, and
   at least one resource distribution node configured to determine in response to a request for access to one of said videoconference applications a selected of said plurality of redundant videoconference applications to utilize,
   wherein each of said plurality of redundant videoconference applications has an available capacity and wherein said selected application is other than said application having the greatest capacity.

12. The videoconference system of claim 11 wherein each said presence node application periodically accesses said database and synchronizes said database with current status maintained by said presence application.

13. The videoconference system of claim 5 further comprising a server lookup table, and wherein said user submits a request for an IP address of a conference server to said lookup table and said server lookup table returns an IP address of one of said resource distribution nodes in communication with said conference server, wherein requests for a conference server communicated from said user will be sent to one of said resource distribution nodes.

14. The videoconference system of claim 5 wherein said resource distribution node performs the following steps:
   if said resource distribution node determines that a first of said conference servers is scheduled to go offline, the following steps are performed:
      said resource distribution node identifies said first conference server and prevents new users from connecting to said first conference server;
      a list of connected users connected to said first conference server is determined and said connected users are sequentially disconnected over a period of time until all said connected users have been disconnected from said first conference server while avoiding disconnecting all said connected users simultaneously; and
      said conference server is set to offline status if it is determined that the communication and audio and video data has terminated.

15. The videoconference system of claim 14 wherein said first conference server executes a disconnection protocol to sequentially disconnect said connected users, and wherein said period of time is at least three minutes.

16. The videoconference system of claim 14 wherein said connected users are sequentially disconnected in at least four groups, said plurality of connected users divided about substantially evenly amongst said groups wherein each of said groups includes substantially the same number of users and each contains a plurality of users.

17. The videoconference system of claim 14 wherein videoconference applications running on said server are partitioned into priority and non-priority applications, and wherein priority applications are terminated in a different manner than non-priority applications.

18. The videoconference system of claim 14 wherein said first conference server is running multiple videoconference applications including at least a conference bridge, and wherein said first conference server disconnects said connected users from each said application except for said conference bridge application, and allows said connected users to remain connected to said conference bridge application for a period of time of at least 3 minutes.

19. A computer program product for managing resource distribution among a plurality of redundant videoconference server applications distributed among a plurality of conference servers associated with at least one resource distribution node, the program product comprising executable instructions stored on a non-transitory medium, the instructions when executed causing the resource distribution node to perform steps comprising:
   periodically and repeatedly survey multiple conference servers that are each running redundant conference applications to determine which of the redundant videoconference applications are currently running and their current status;
   to store the identity of currently running applications and current status in a memory, the applications including at least conference bridges and second applications;
   in response to a request to access a conference bridge received from a first requesting user, to query the memory and to apply a first selection rule to identify a most appropriate conference bridge located on a first conference server for use by the requesting user;
   to communicate to the first requesting user a message including the location of the most appropriate conference bridge so that the first requesting user will connect to that application;
   in response to a request to access a second conference application that is not a conference bridge received from the first requesting user, to query the memory and to apply a second selection rule that is different than the first selection rule to identify a most appropriate second conference application located on a second conference server for use by the first requesting user; and
   to communicate to the first requesting user a message including the location of the second conference application on the second server so that the first requesting user will connect to that application.

20. The method of claim 19 wherein the first selection rule is based on determining the conference bridge with the lowest current load on it, and wherein the second selection rule is based on geographic proximity.

21. The method of claim 19 wherein the first selection rule is based on determining the conference bridge already running a conference session for an associated meeting, and wherein the second selection rule is based on geographic proximity.

* * * * *